Feb. 23, 1954
J. S. BURGE ET AL
2,669,771
ARMATURE COIL LEAD STAKER
Filed Nov. 17, 1949
28 Sheets-Sheet 2
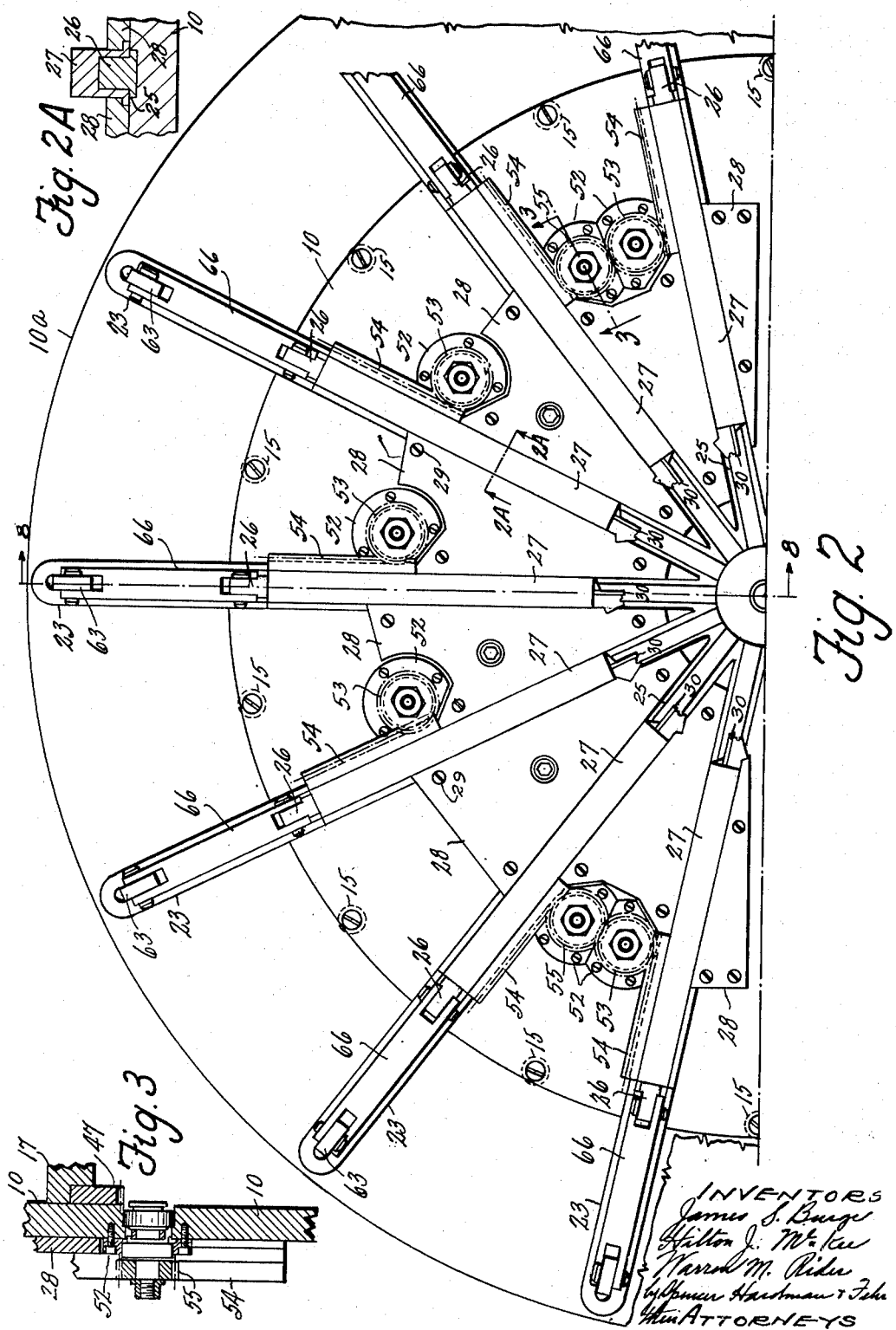

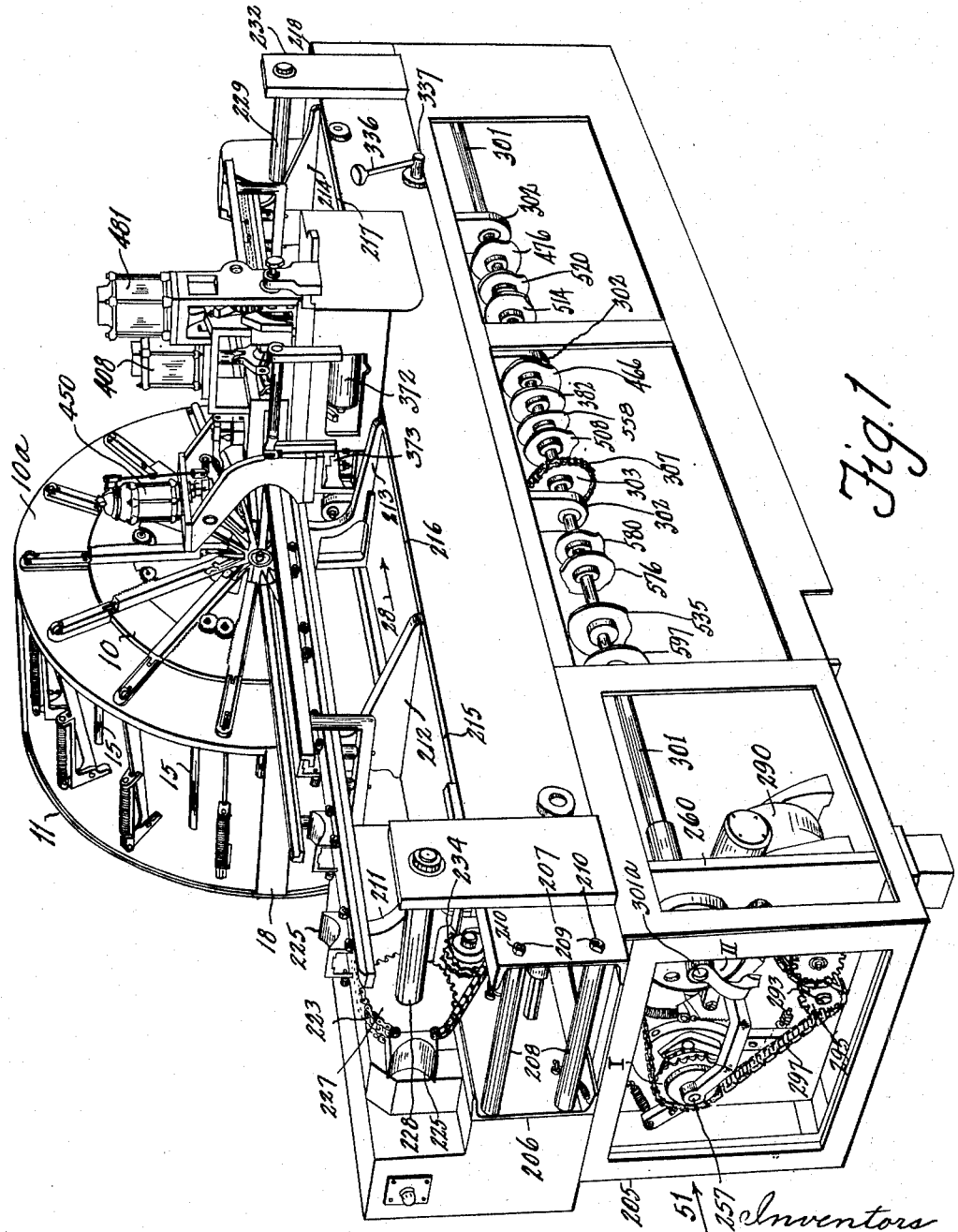

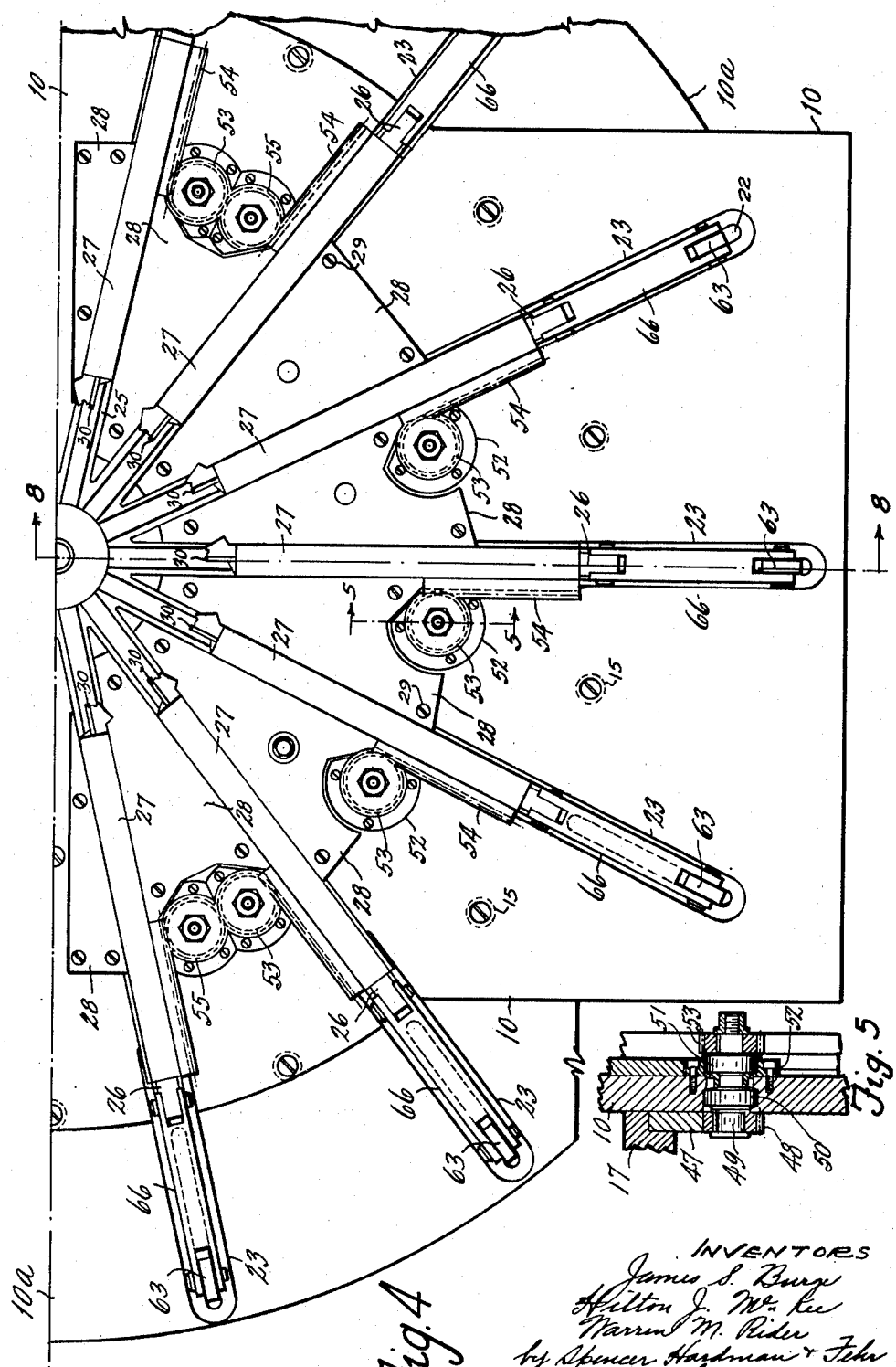

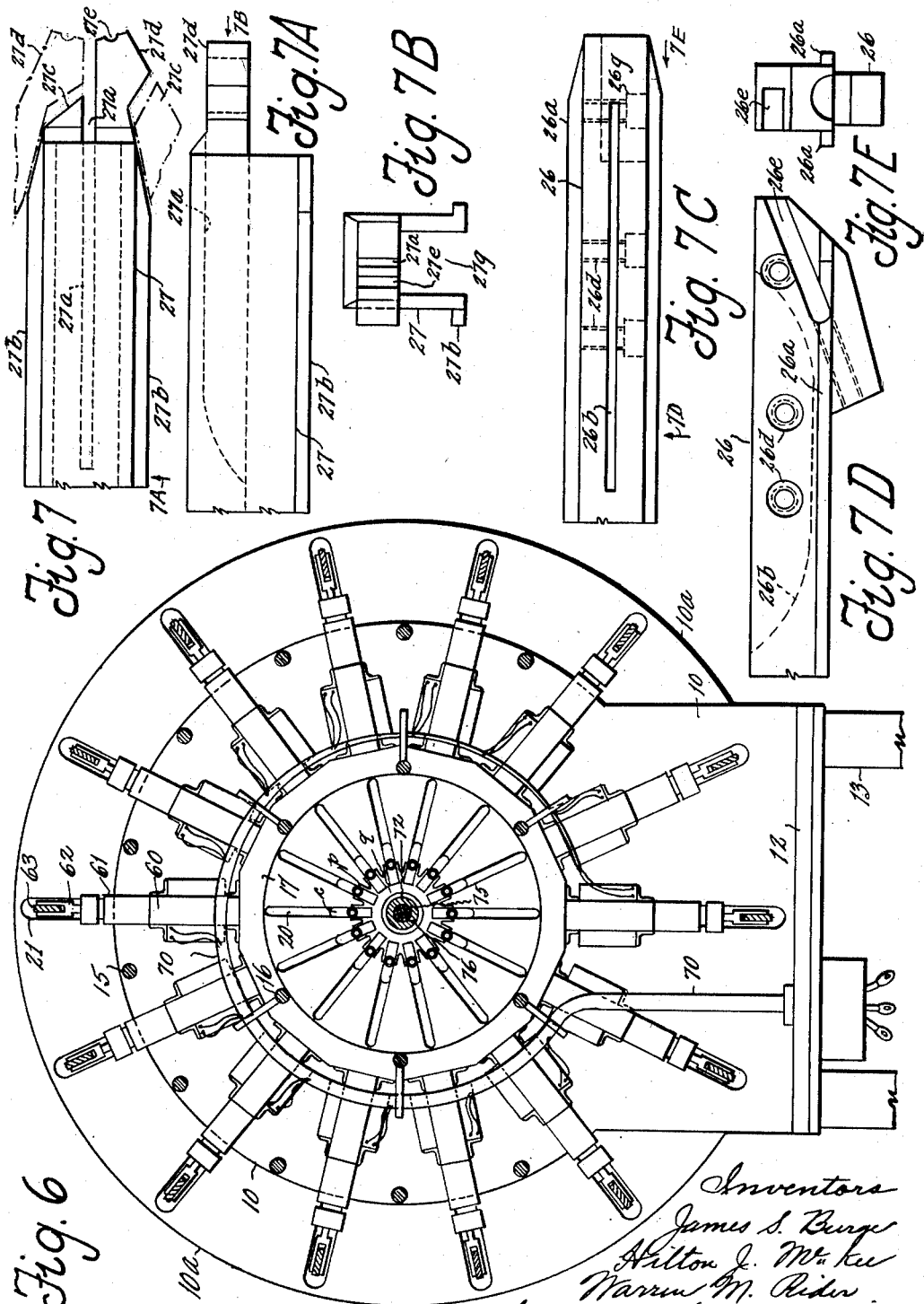

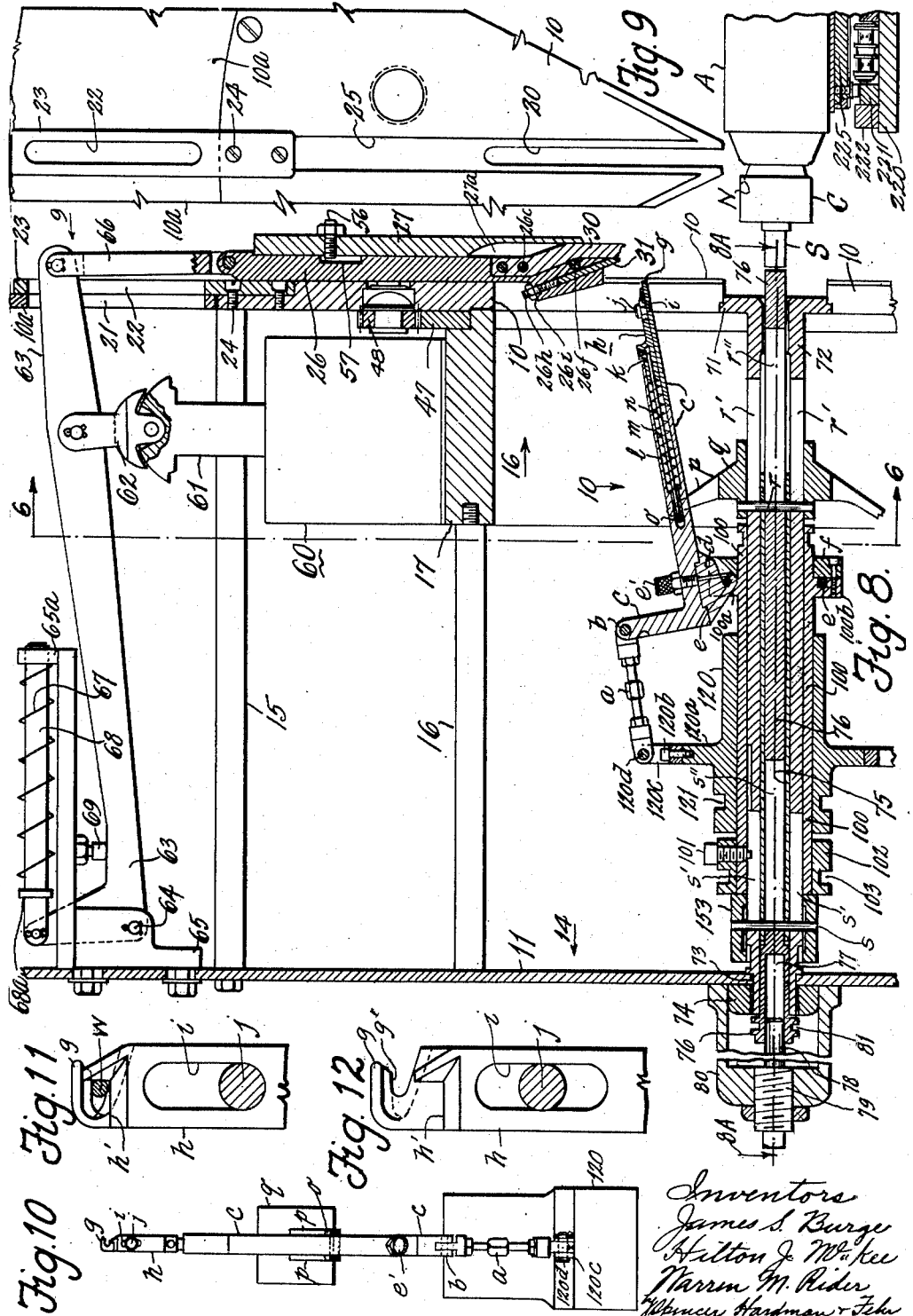

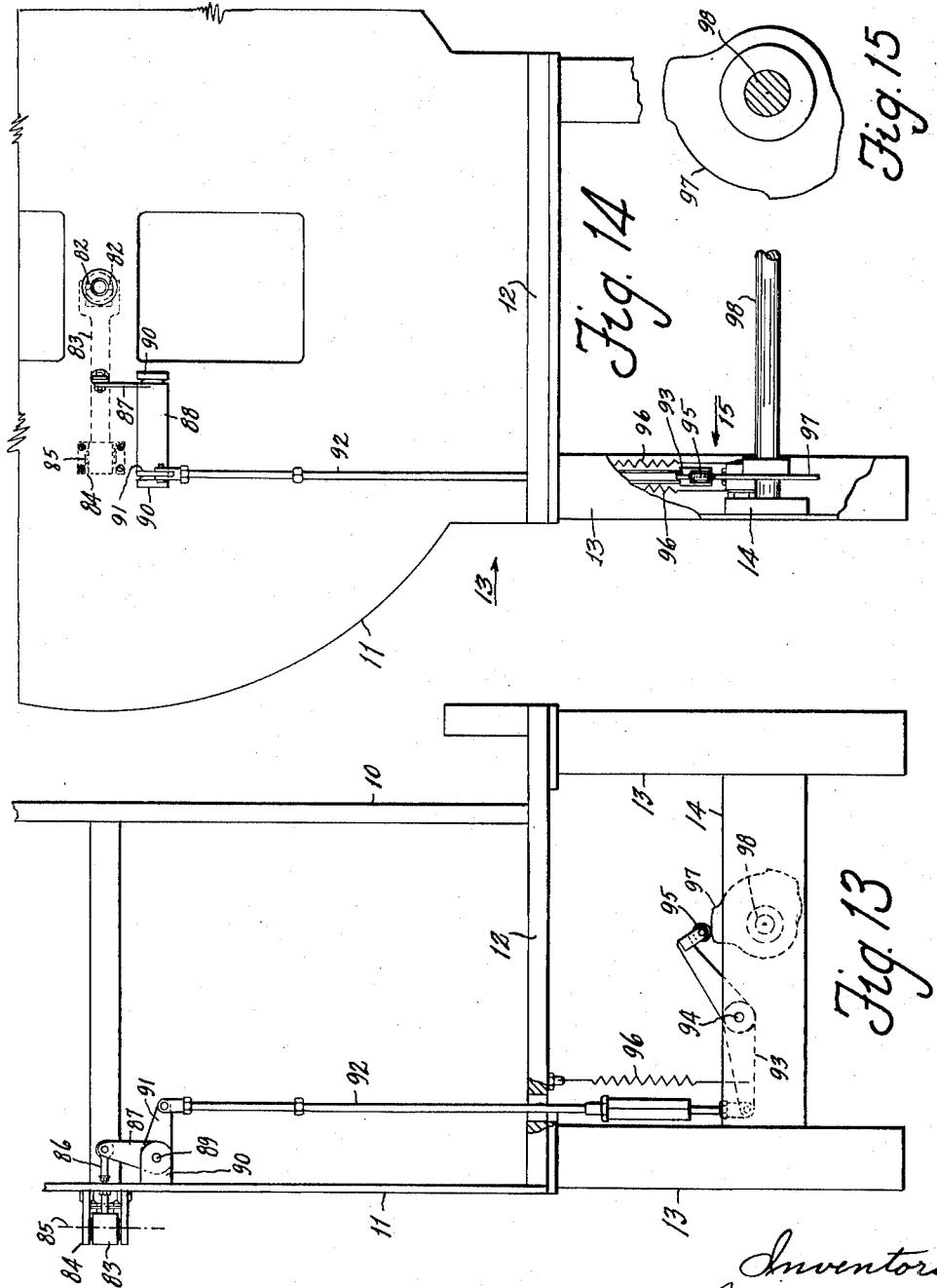

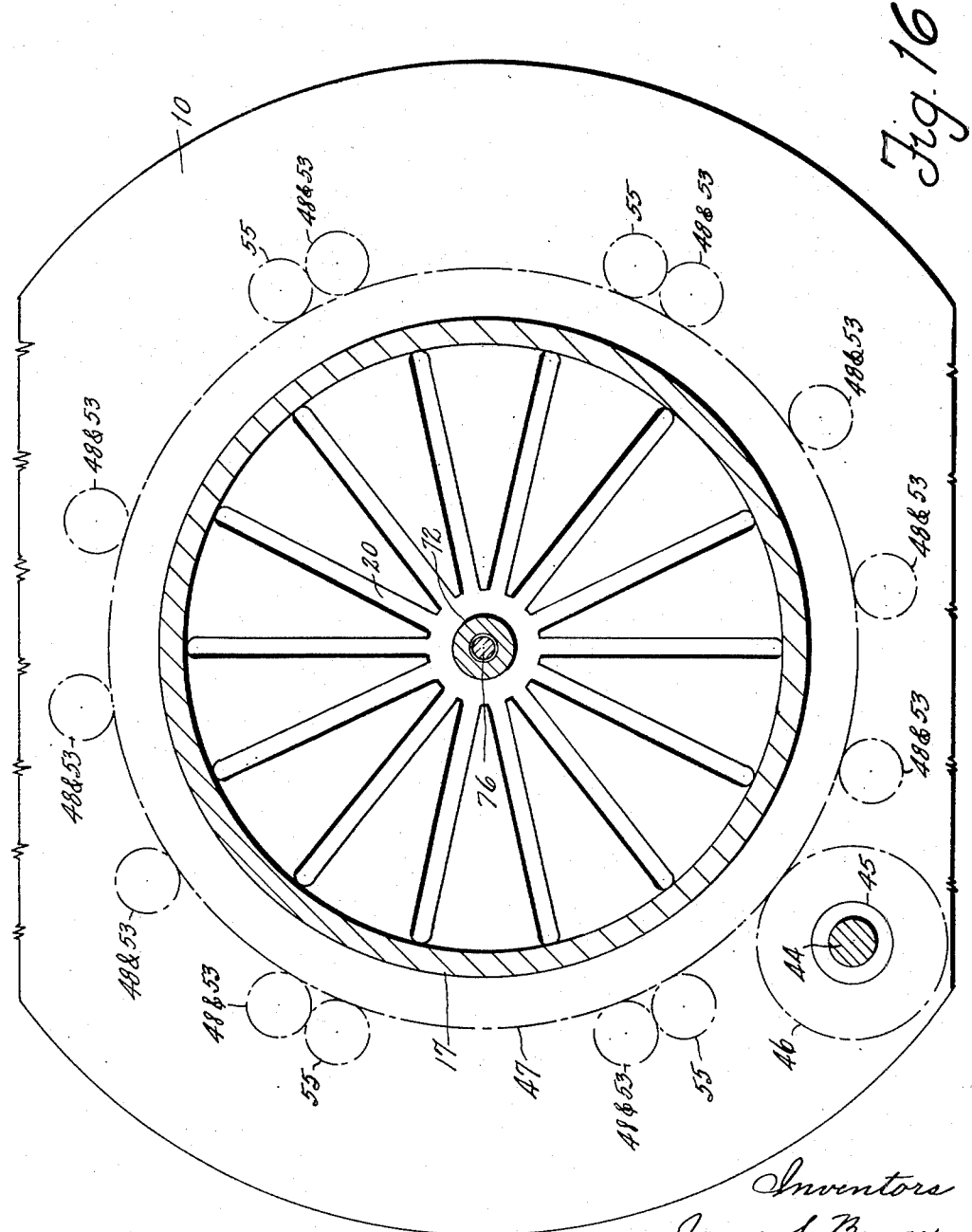

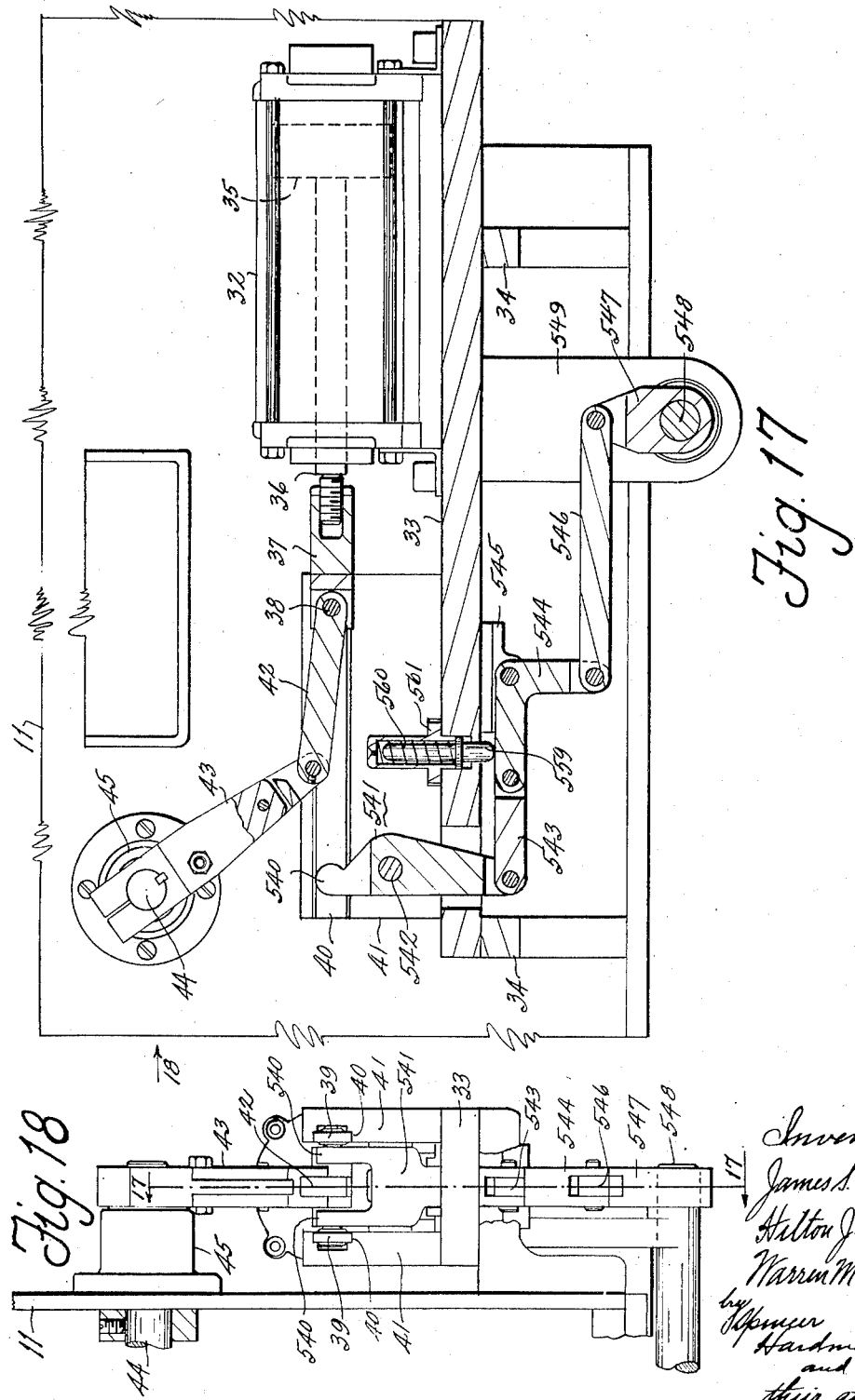

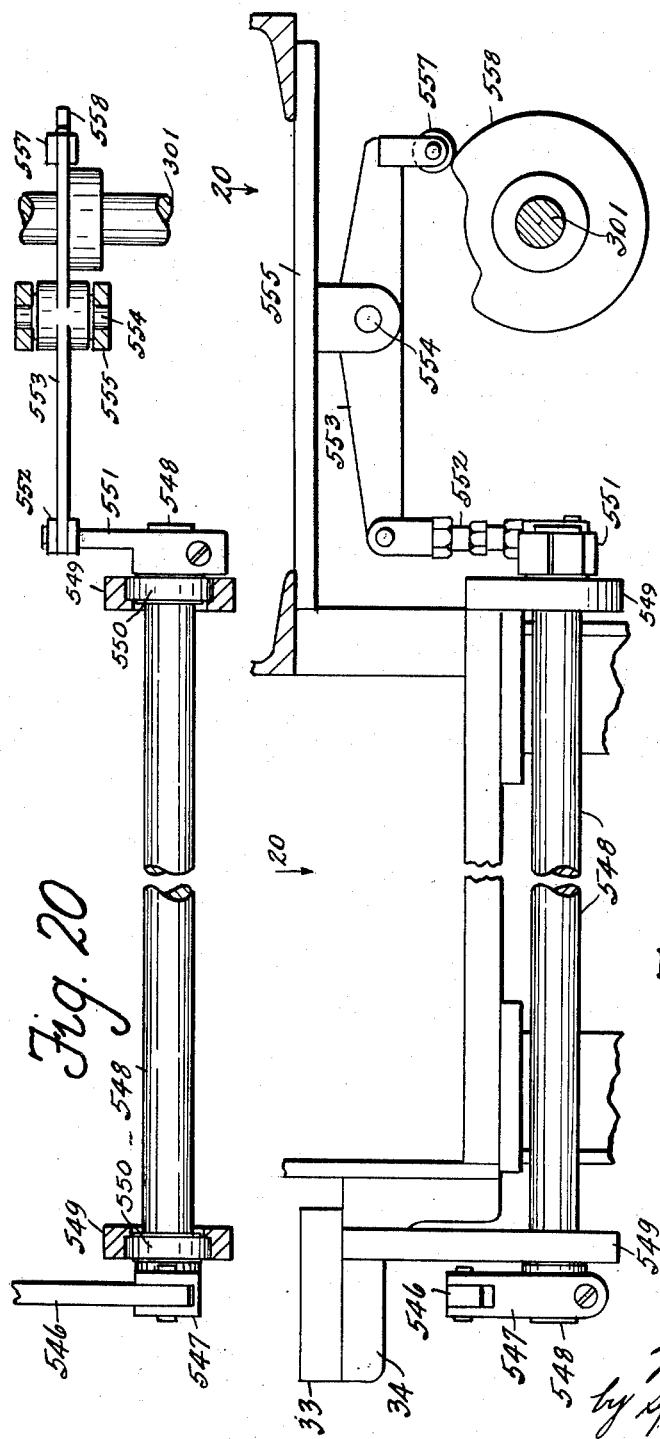

Feb. 23, 1954  J. S. BURGE ET AL  2,669,771
ARMATURE COIL LEAD STAKER
Filed Nov. 17, 1949  28 Sheets-Sheet 10
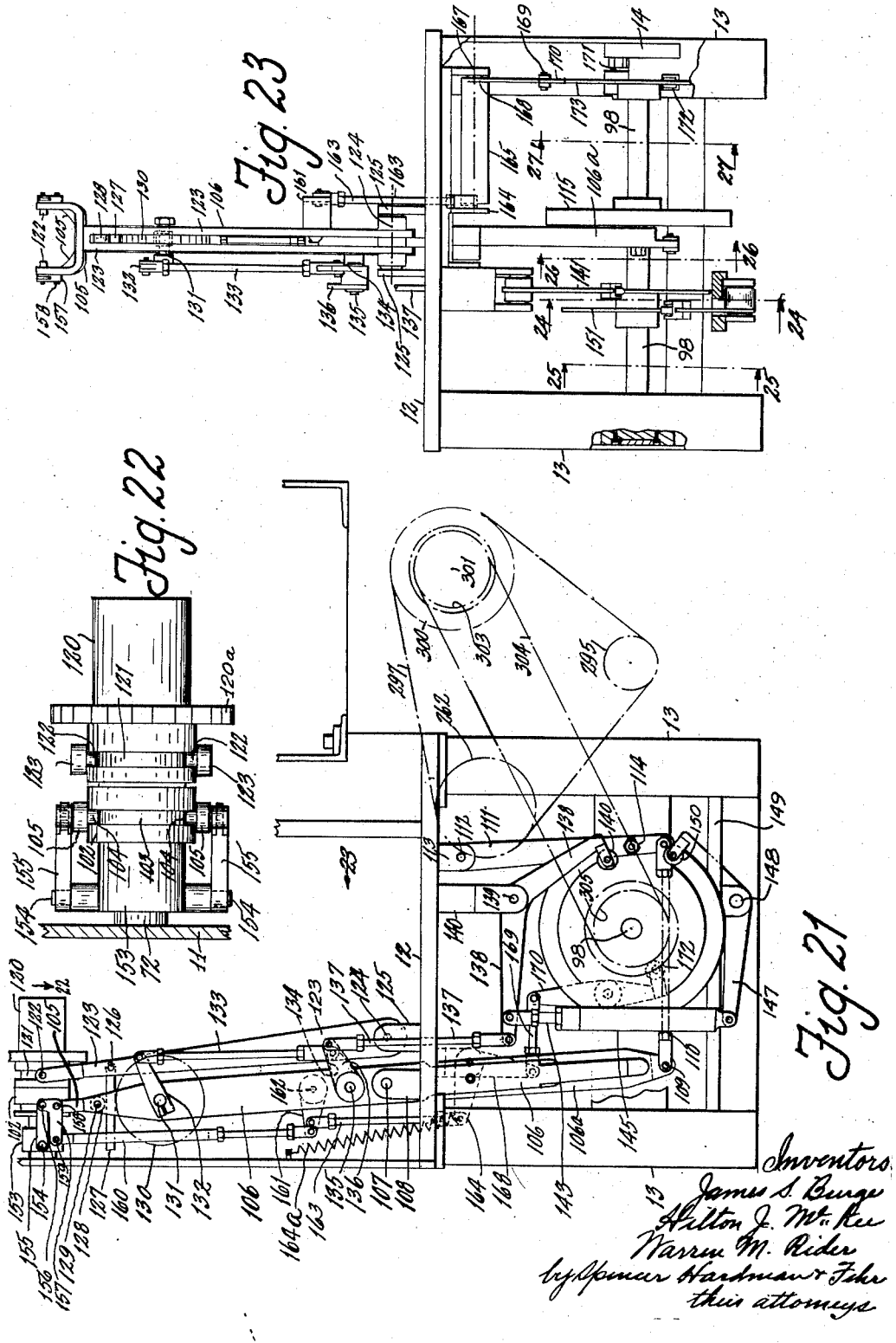

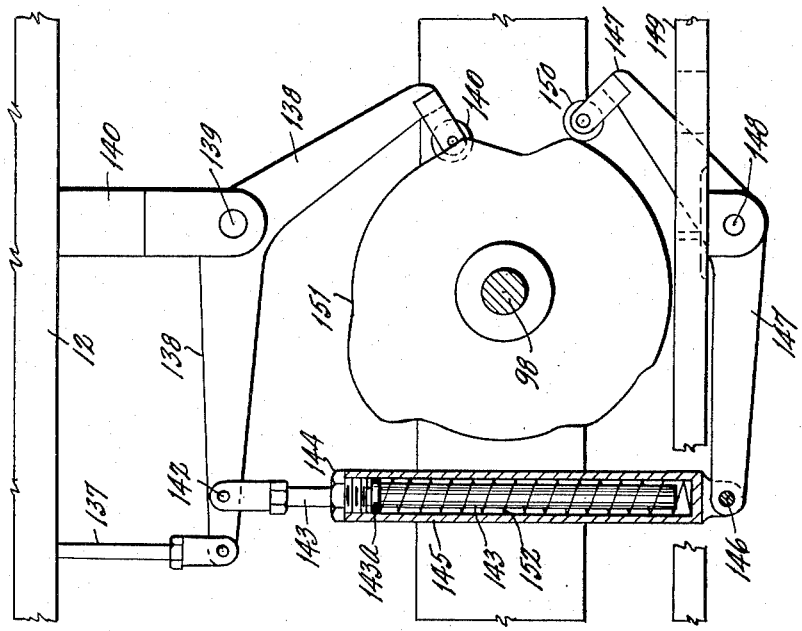
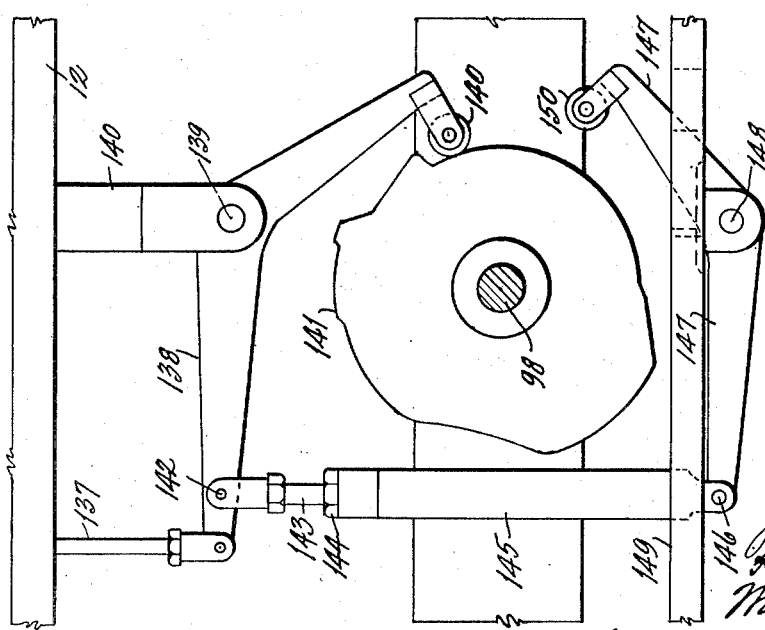

Feb. 23, 1954       J. S. BURGE ET AL       2,669,771
               ARMATURE COIL LEAD STAKER
Filed Nov. 17, 1949                    28 Sheets-Sheet 12
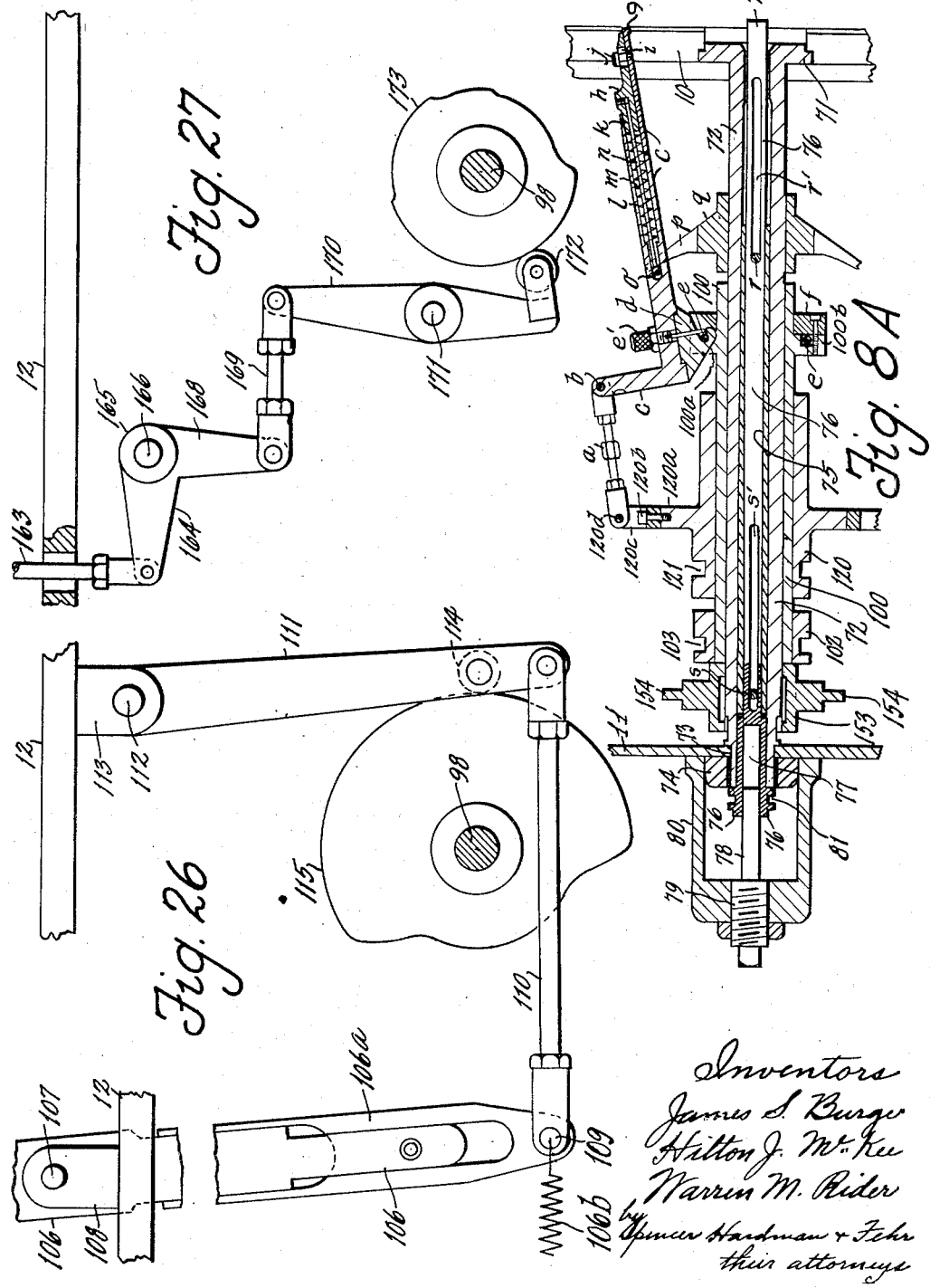

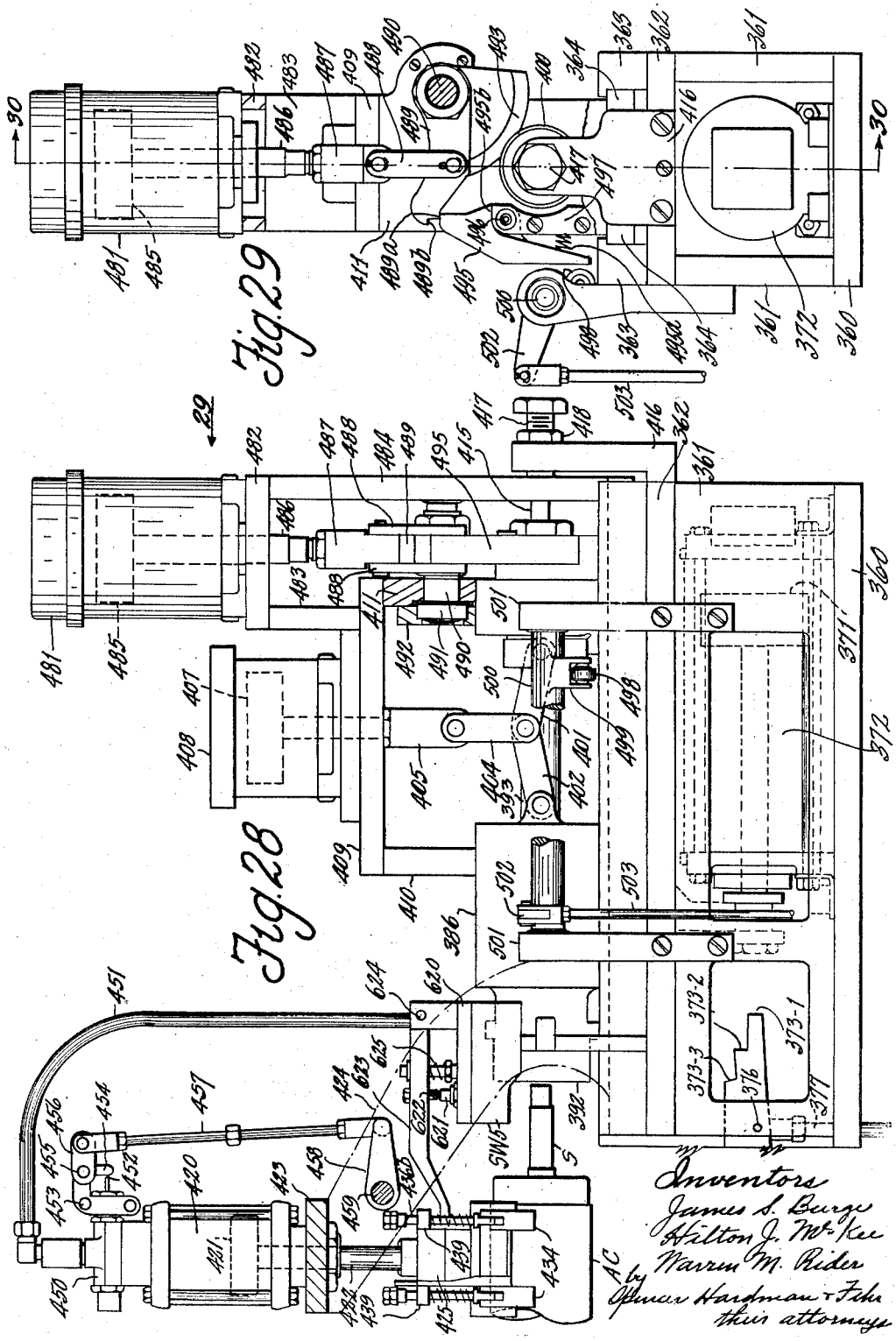

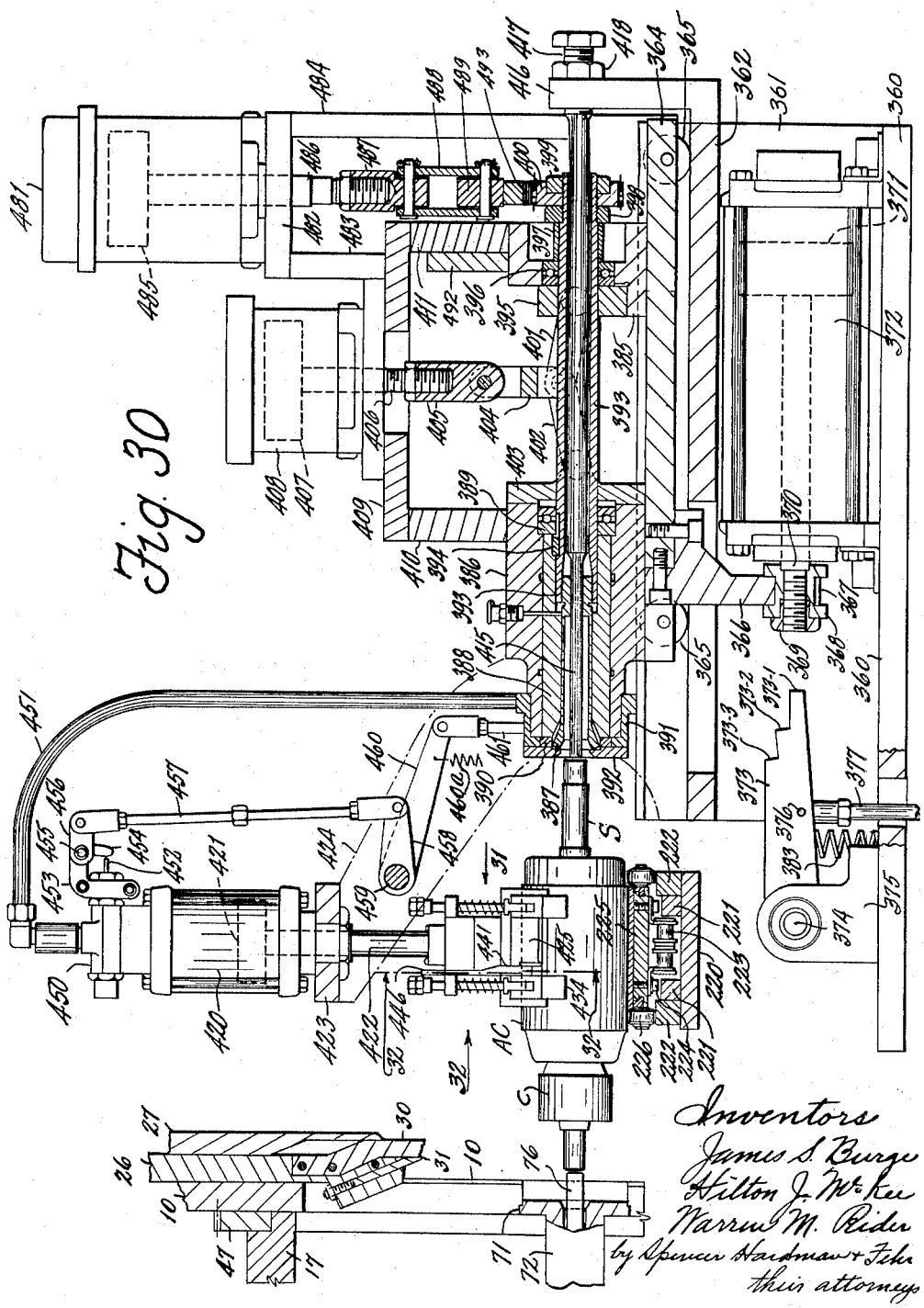

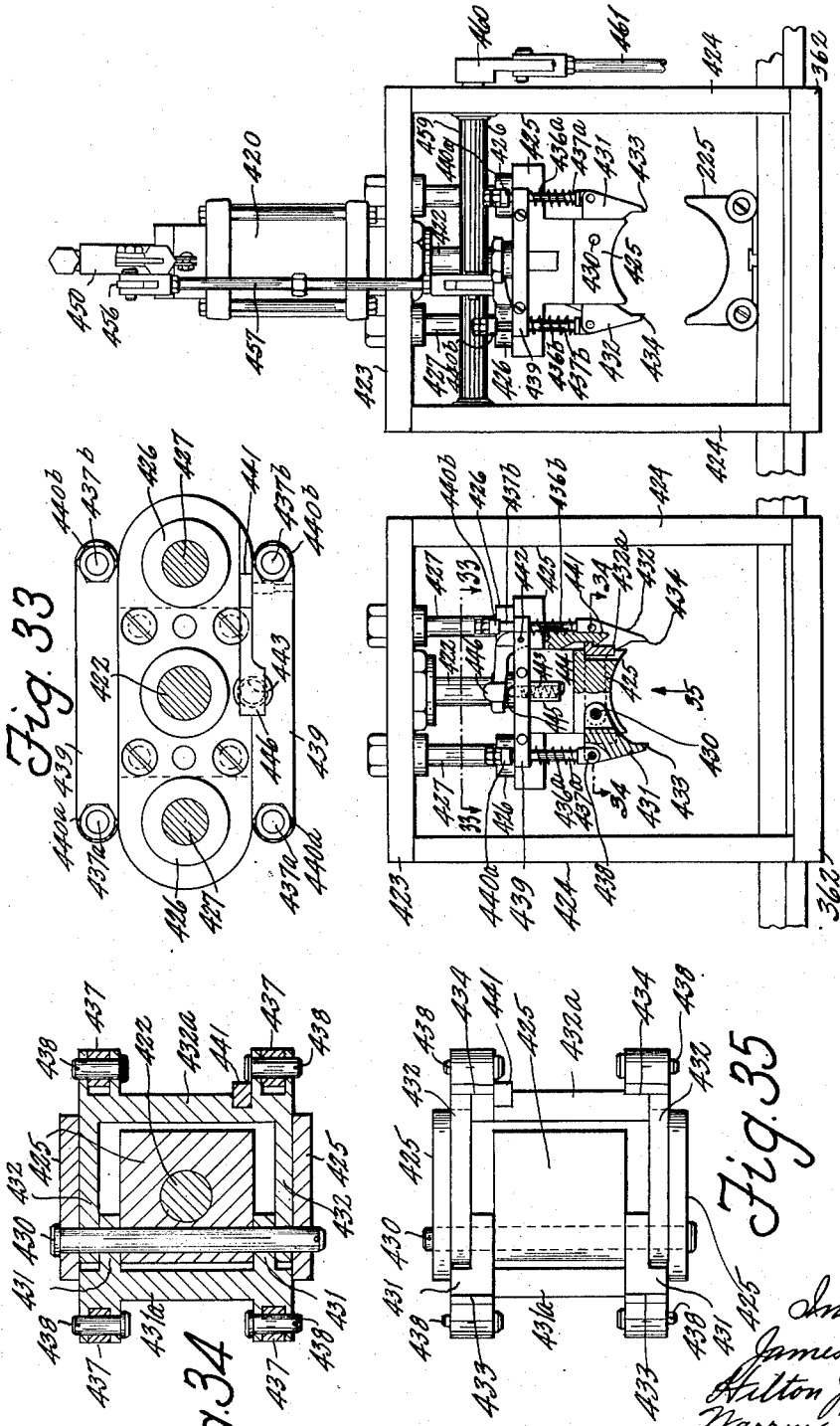

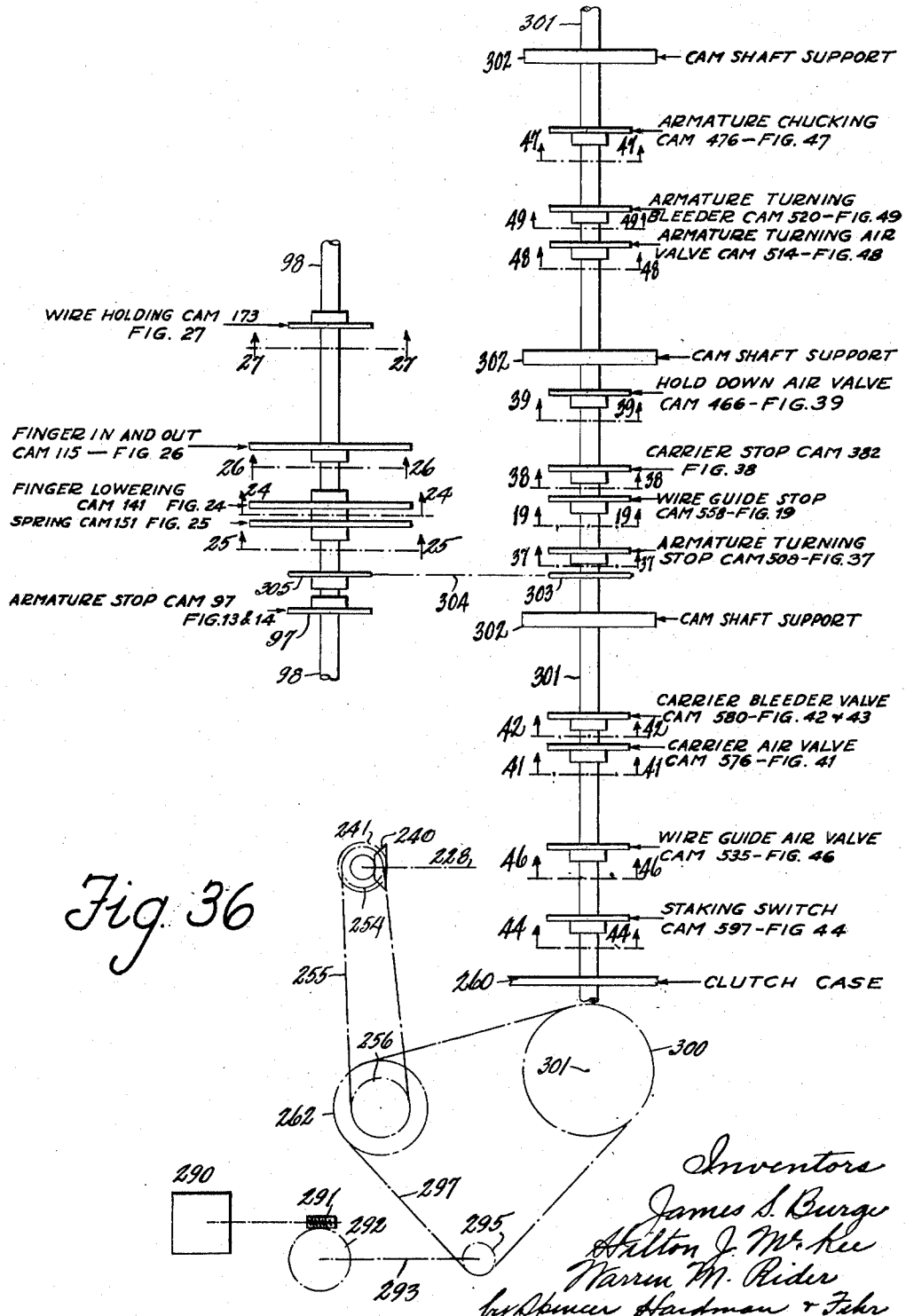

Feb. 23, 1954 J. S. BURGE ET AL 2,669,771
ARMATURE COIL LEAD STAKER
Filed Nov. 17, 1949 28 Sheets-Sheet 17
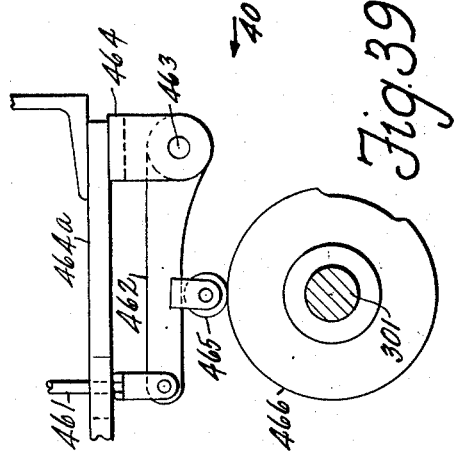
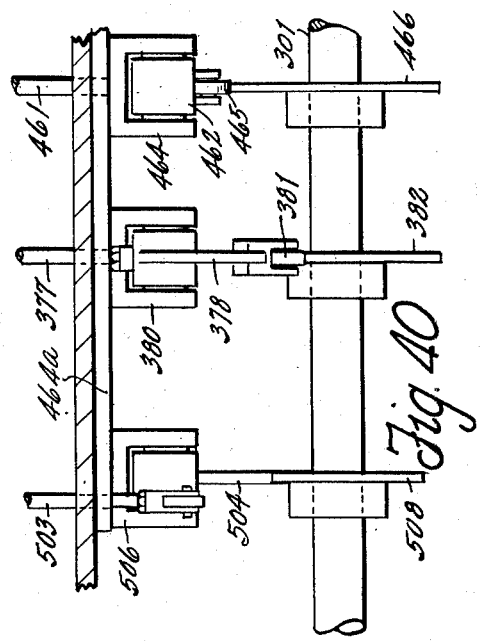
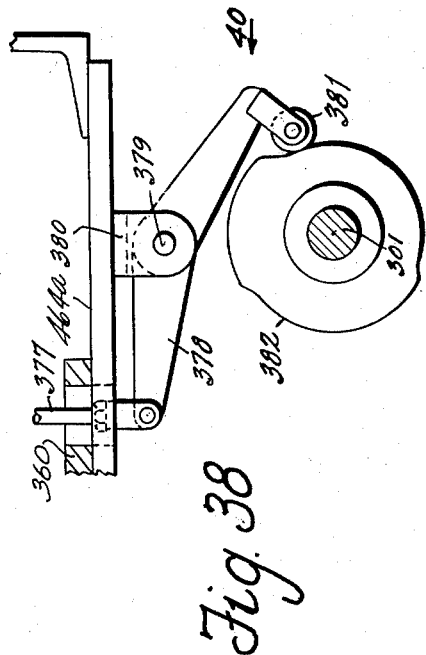
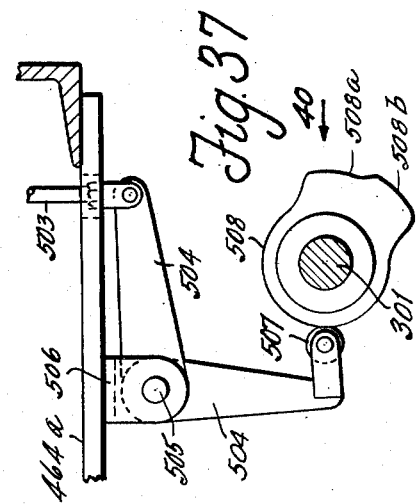
Inventors
James S. Burge
Hilton J. McKee
Warren M. Rider
by Spencer Hardman & Fehr
their attorneys

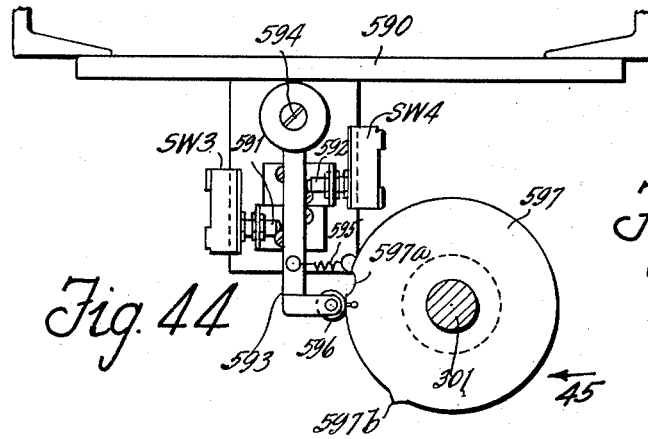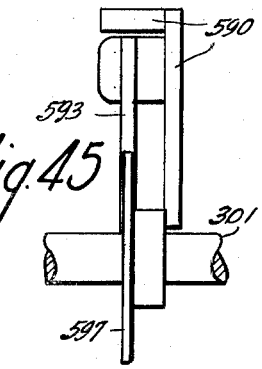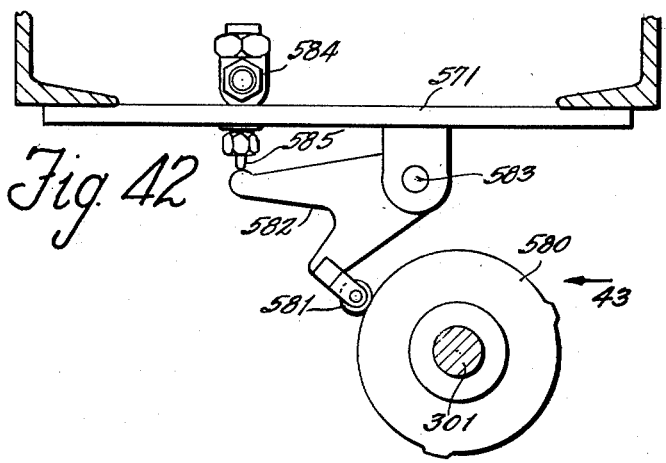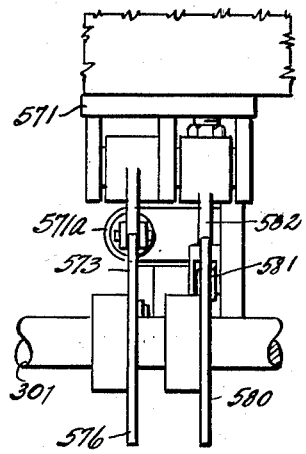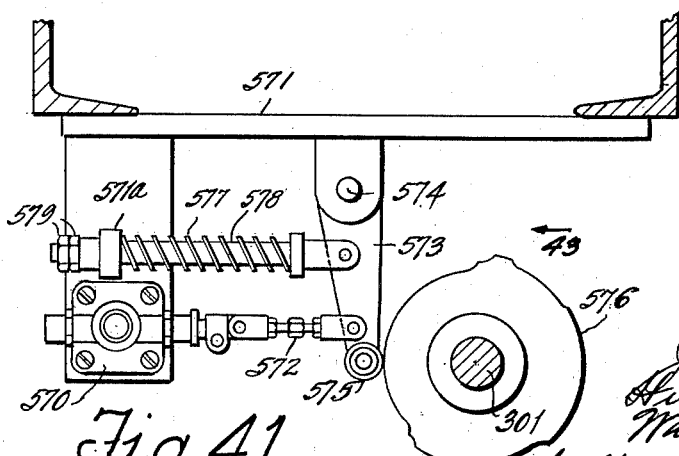

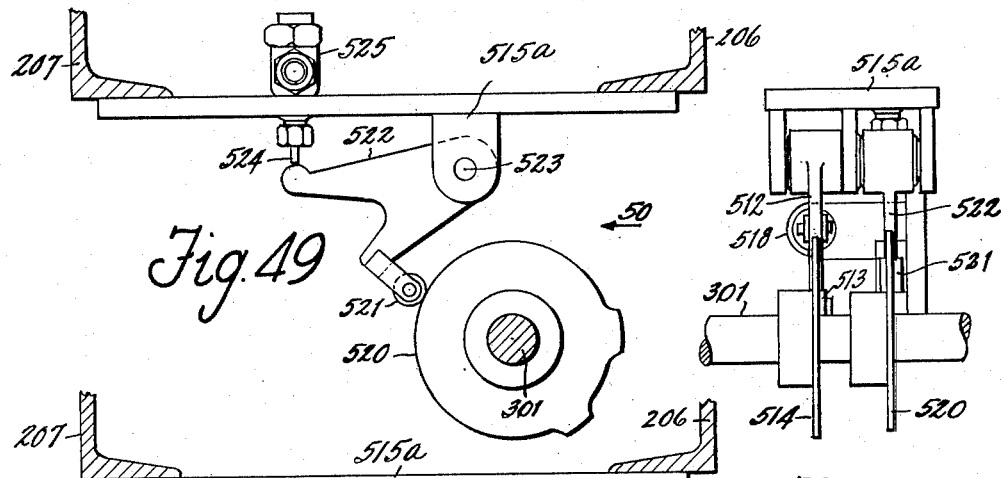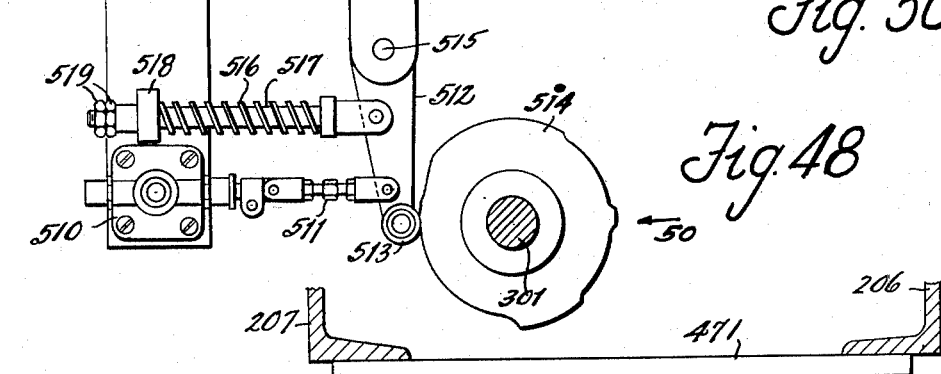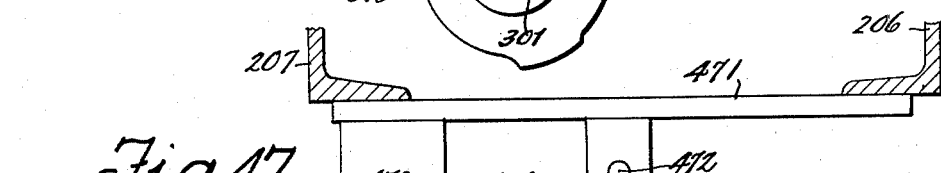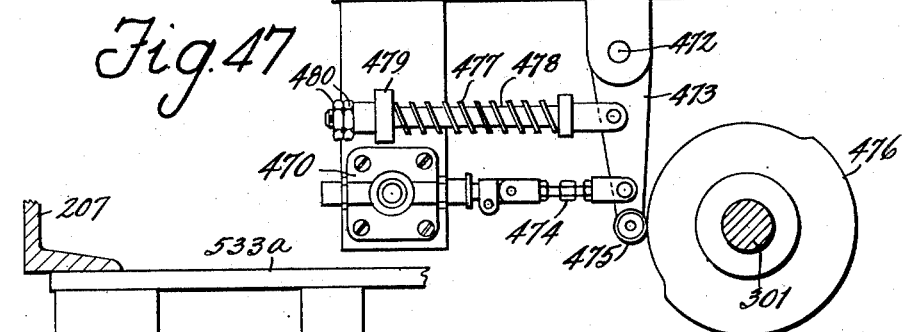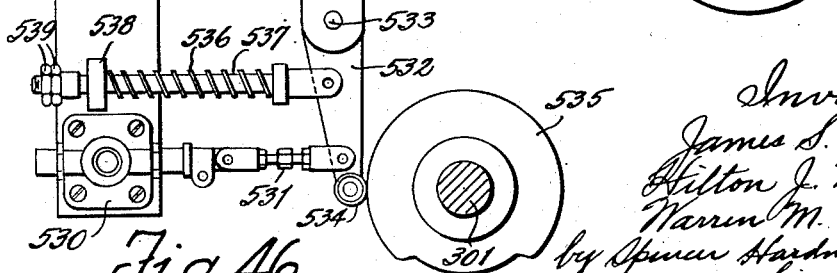

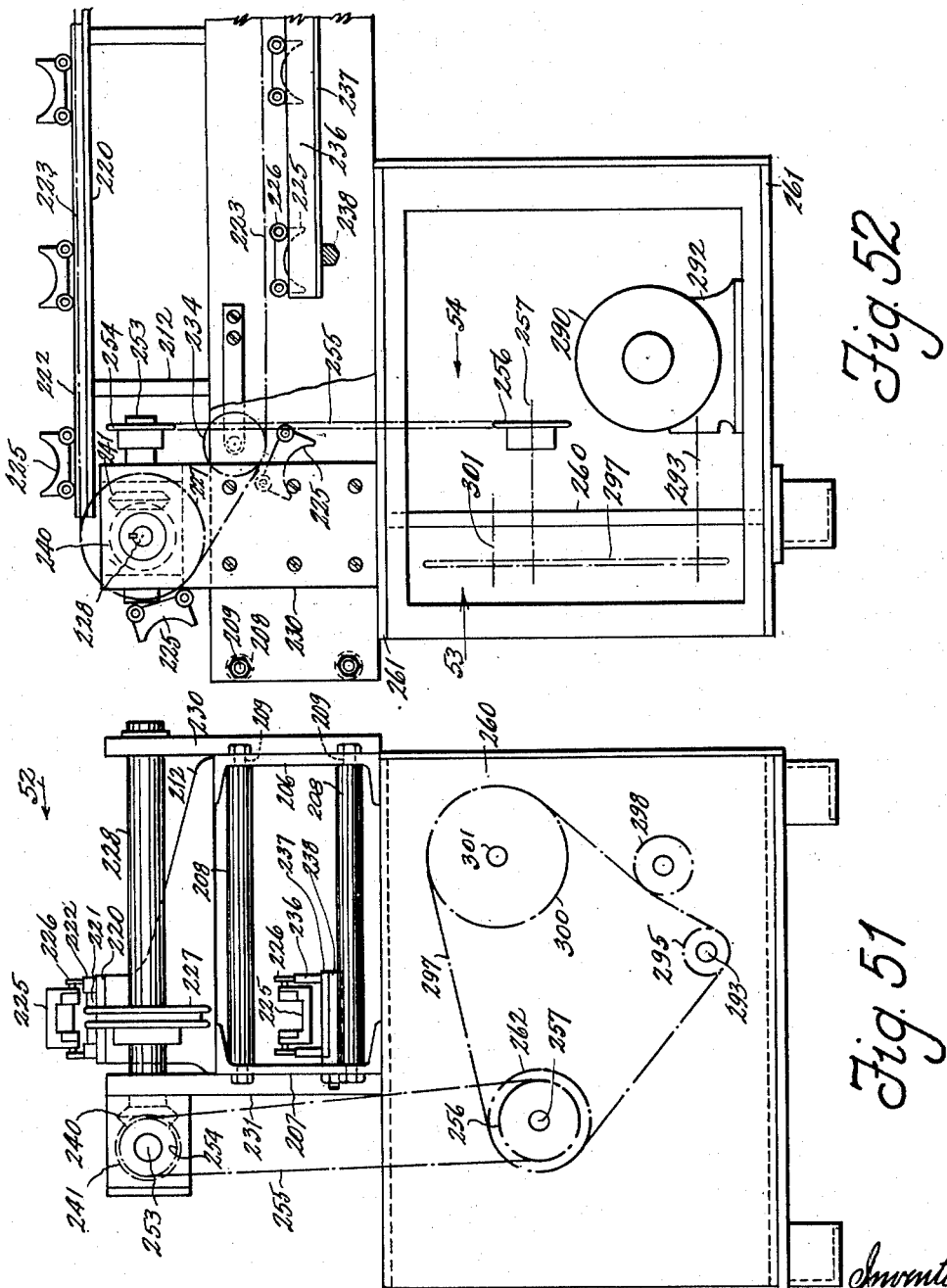

Feb. 23, 1954 J. S. BURGE ET AL 2,669,771
ARMATURE COIL LEAD STAKER
Filed Nov. 17, 1949 28 Sheets-Sheet 23

Feb. 23, 1954 J. S. BURGE ET AL 2,669,771
ARMATURE COIL LEAD STAKER
Filed Nov. 17, 1949 28 Sheets-Sheet 24

Inventors
James S. Burge
Hilton J. McKee
Warren M. Rider
by Spencer Hardman & Fehr
their attorneys

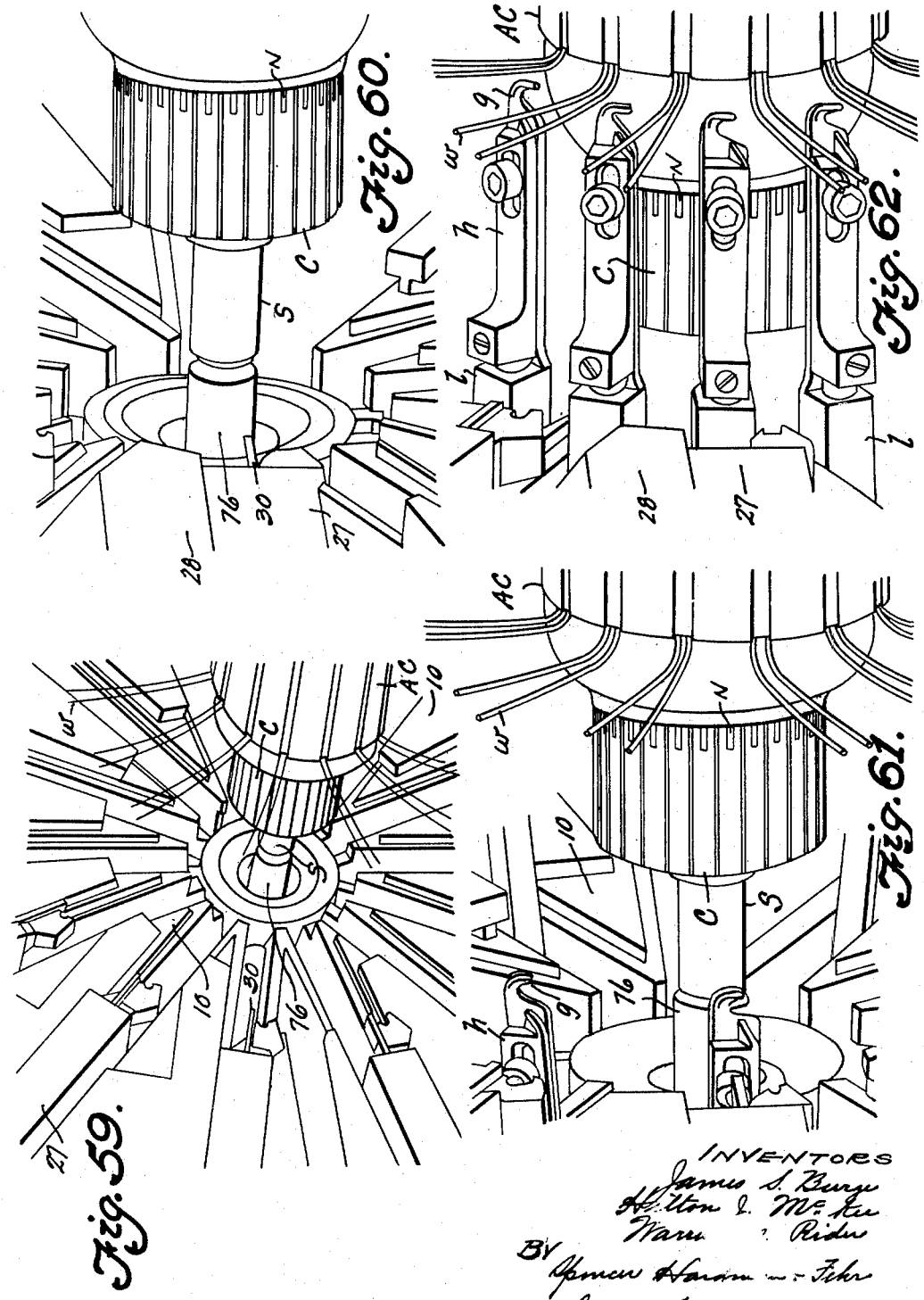

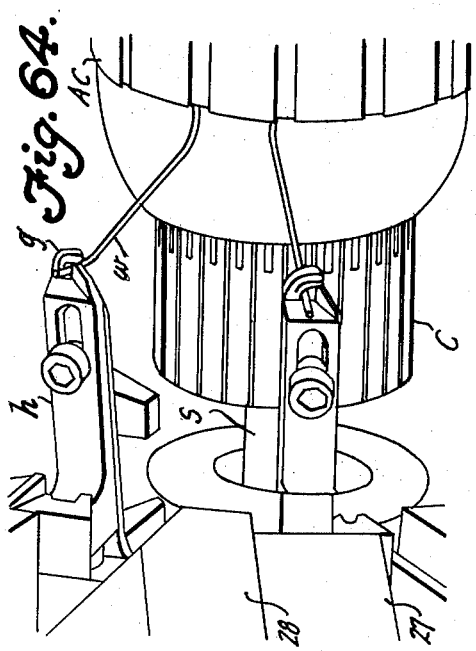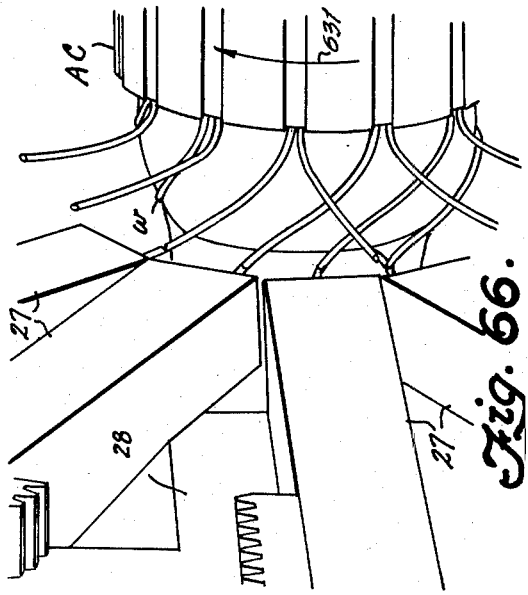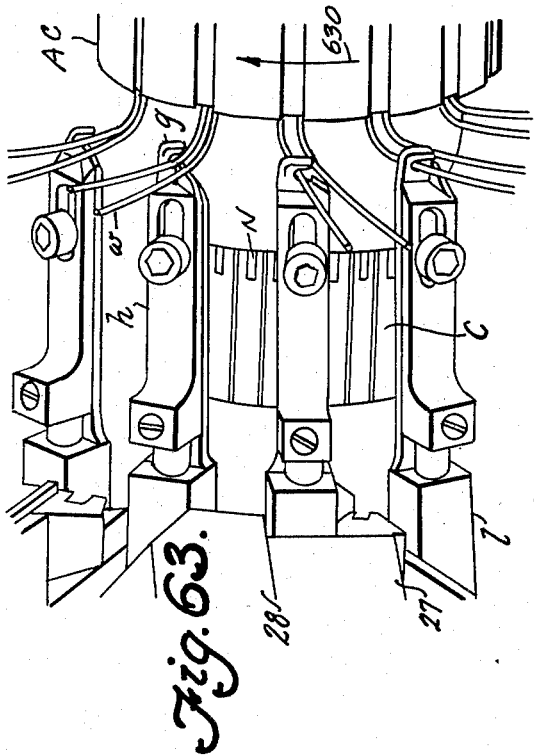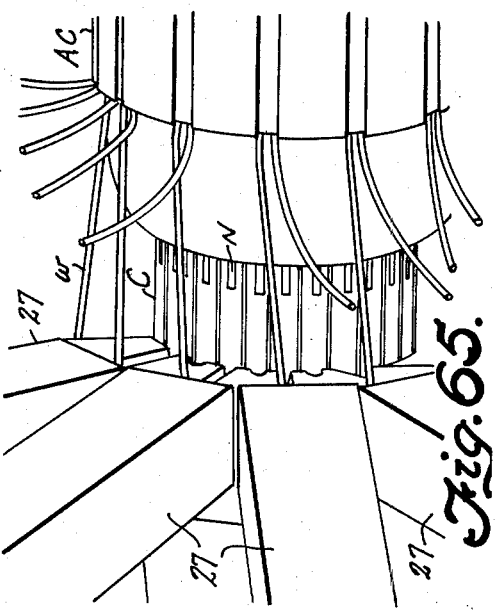

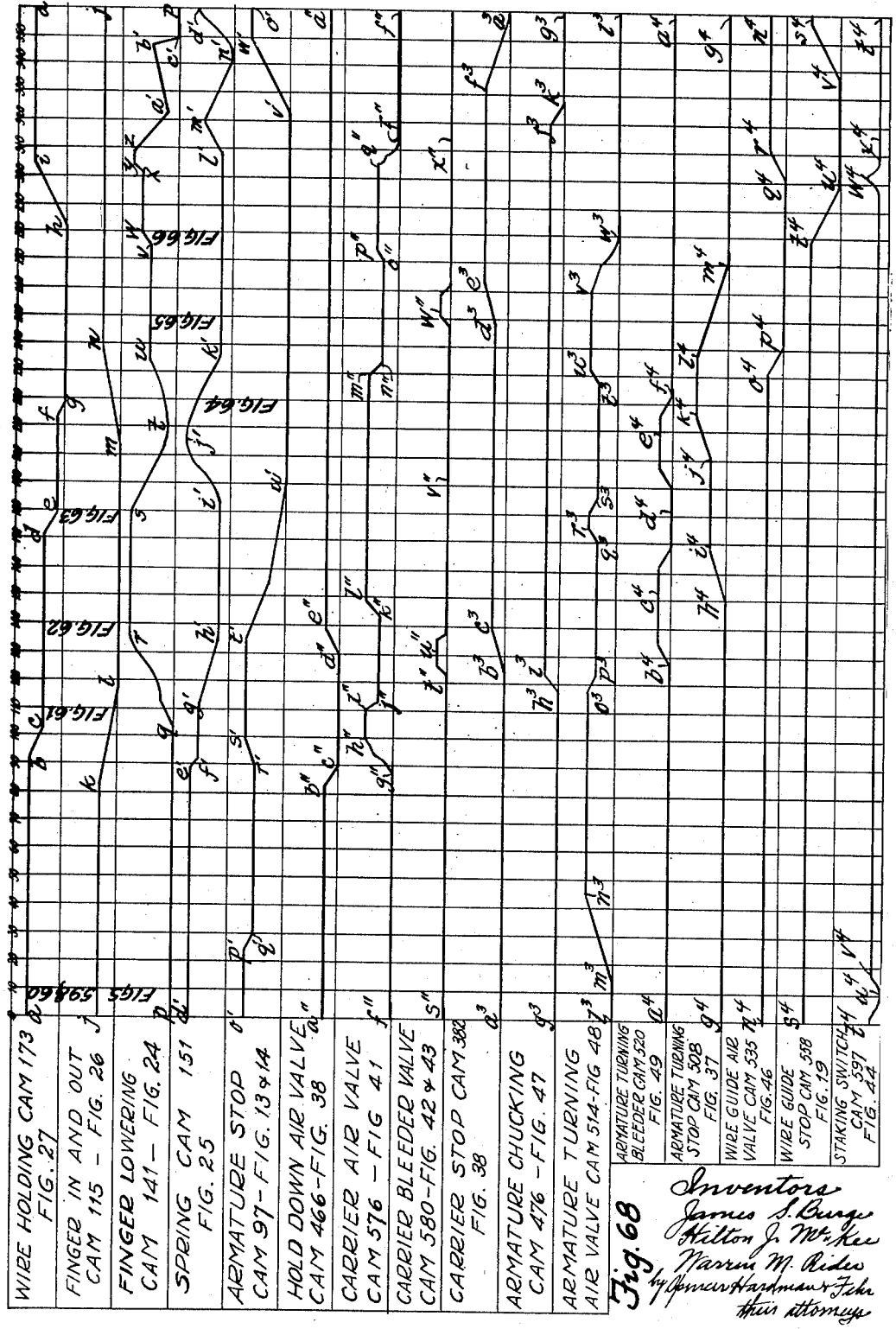

Patented Feb. 23, 1954

2,669,771

UNITED STATES PATENT OFFICE 2,669,771

ARMATURE COIL LEAD STAKER

James S. Burge, Anderson, Hilton J. McKee, Middletown, and Warren M. Rider, Anderson, Ind., assignors to General Motors Corporation, Detroit, Mich., a corporation of Delaware Application November 17, 1949, Serial No. 127,924

12 Claims. (Cl. 29—205)

1

This invention relates to the manufacture of armatures for dynamoelectric machines and its object is to provide a machine for simultaneously inserting wires leading from the ends of armature coils into the slots of the proper commutator bars. To accomplish this object, the present invention provides mechanical fingers for grasping the lead wires of armature coils and causing them to be located properly to be received by wire guiding bars which move radially inwardly to locate the wires in alignment with commutator segments and means for rotating the armature core in order to register the lead wires with the proper commutator segments and means for causing the lead wires so positioned to be forced into the notches of the commutator bars aligned therewith.

Further objects and advantages of the present invention will be apparent from the following description, reference being had to the accompanying drawings, wherein a preferred embodiment of the present invention is clearly shown.

In the drawings:

Fig. 1 is a perspective view of a machine embodying the present invention.

Fig. 2 on Sheet 2 and Fig. 4 on Sheet 3 together comprise a front view of that portion of the machine which shows the radially movable guides and staking bars.

Fig. 2A is a sectional view on line 2A—2A of Fig. 2.

Fig. 3 is a sectional view on line 3—3 of Fig. 2.

Fig. 5 is a sectional view on line 5—5 of Fig. 4.

Fig. 6 is a sectional view on line 6—6 of Fig. 8 and is drawn to a smaller scale.

Fig. 7 is a plan view of a fragment of one of the bars 27 shown on smaller scale in Figs. 2, 3 and 8.

Fig. 7A is a view in the direction of arrow 7A of Fig. 7.

Fig. 7B is a view in the direction of arrow 7B of Fig. 7.

Fig. 7C is a plan view of a fragment of one of the bars 26 shown in Fig. 8.

Fig. 7D is a view in the direction of arrow 7D of Fig. 7C.

Fig. 7E is a view in the direction of arrow 7E of Fig. 7C.

Fig. 8 is a fragmentary sectional view on the line 88 of Fig. 2.

Figure 53:
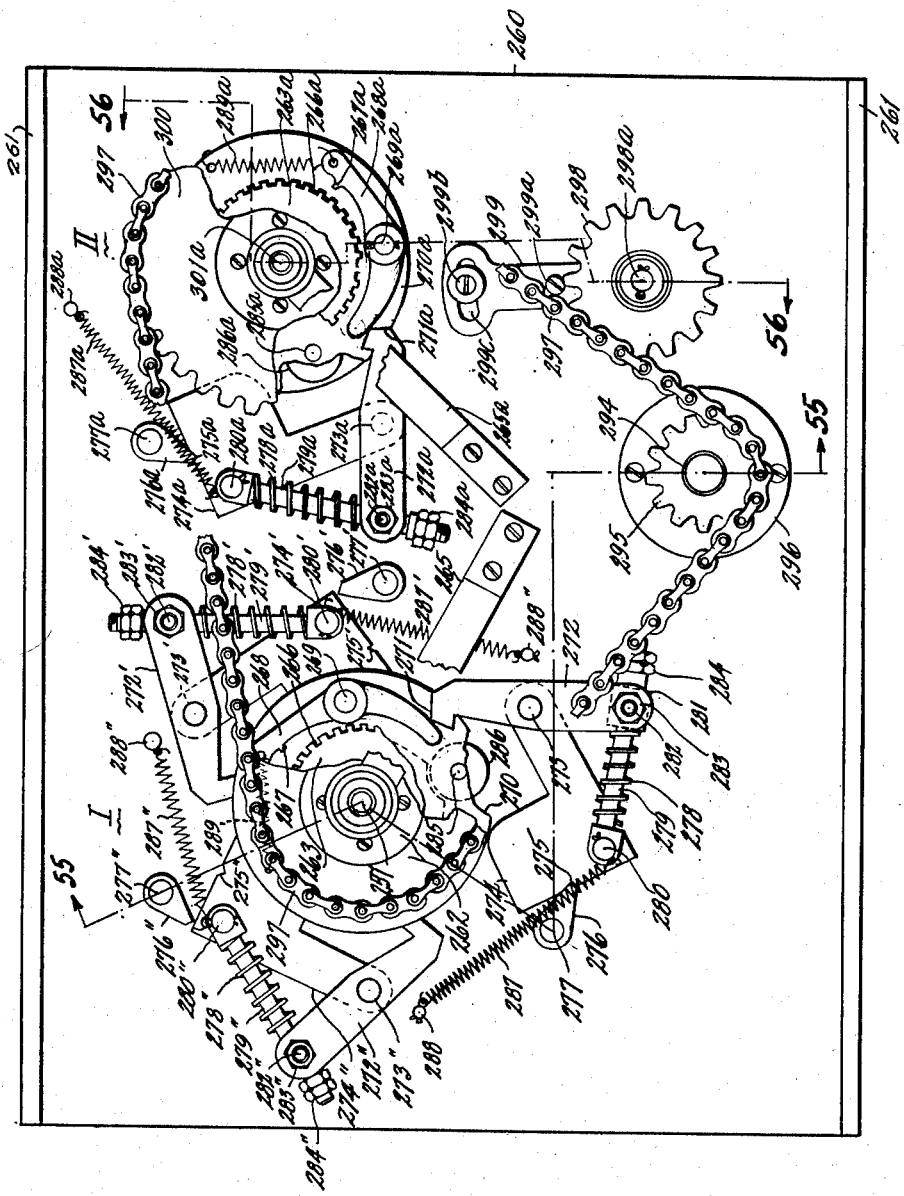

Fig. 8A, which is on the same sheet with Figs. 26 and 27, is a sectional view on line 8A—8A of Fig. 8.

2

Fig. 9 is a fragmentary view of a plate 10 looking in the direction of arrow 9 of Fig. 8.

Fig. 10 is a fragmentary plan view in the direction of arrow 10 of Fig. 8.

Figs. 11 and 12 drawn to a much larger scale than Fig. 10, shows parts at the upper end of Fig. 10 in different positions.

Fig. 13 is a view in the direction of arrow 13 of Fig. 14.

Fig. 14 is a view of a portion of the apparatus looking in the direction of arrow 14 of Fig. 8.

Fig. 15 is an enlarged view of cam 97 looking in the direction of arrow 15 of Fig. 14.

Fig. 16 is a view in the direction of arrow 16 of Fig. 8 and shows diagrammatically a mechanism for operating the radially movable wire guides.

Fig. 17 is a fragmentary view from the rear of the machine and is partly in section on line 17—17 of Fig. 18 and shows a mechanism for operating the mechanism shown in Fig. 16.

Fig. 18 is a view in the direction of arrow 18 of Fig. 17.

Fig. 19 shows a wire guide stop cam 558 and mechanism operated thereby.

Fig. 20 is a view in the direction of arrow 20 of Fig. 19.

Fig. 21 is a fragmentary side view of the mechanism for effecting movement of certain parts shown in Fig. 8.

Fig. 22 is a fragmentary view on an enlarged scale as viewed in the direction of arrow 22 of Fig. 21.

Fig. 23 is a view in the direction of arrow 23 of Fig. 21.

Fig. 24 which is a sectional view on line 24—24 of Figs. 23 and 36 (which is a mechanism diagram), shows the finger lowering cam 141 and mechanism operated thereby.

Fig. 25 which is a sectional view on line 25—25 of Figs. 23 and 36, shows the spring cam 151 and mechanism operated thereby.

Fig. 26 which is a sectional view on line 26—26 of Figs. 23 and 36, shows the finger in and out cam 115 and levers operated thereby.

Fig. 27 which is a sectional view on line 27—27 of Figs. 23 and 36, shows the wire holding cam 113 and levers operated thereby.

Fig. 28 is a fragmentary side view partly in longitudinal section of a portion of the apparatus as viewed in the direction of arrow 28 of Fig. 1.

Fig. 29 is a view in the direction of arrow 29 of Fig. 28.

Fig. 30 is a longitudinal sectional view of the apparatus shown in Figs. 28 and 29, said section being taken generally on the line 30—30 of Fig. 29.

Fig. 31 is a view in the direction of arrow 31 of Fig. 30.

Fig. 32 is a view in the direction of arrow 32 of Fig. 30 and is partly in section, said section being taken on line 32—32 of Fig. 30.

Fig. 33 is a view on a larger scale than Fig. 32 and is taken on line 33—33 of Fig. 32.

Fig. 34 is a sectional view on line 34—34 of Fig. 32 and is drawn to the same scale as Fig. 33.

Fig. 35 is drawn to the same scale as Fig. 34 and is a view in the direction of arrow 35 of Fig. 32.

Fig. 36 is a mechanism diagram which includes various cams and refers to other figures of the drawings where these cams are shown.

Fig. 37, which is a sectional view on line 37—37 of Fig. 36, shows the armature turning stop cam 508 and a mechanism operated thereby.

Fig. 38 is a sectional view on line 38—38 of Fig. 36, showing the carrier stop cam 382 and a lever operated thereby.

Fig. 39, which is a sectional view on line 39—39 of Fig. 36, shows the hold-down air valve cam 466 and the lever operated thereby.

Fig. 40 is a view in the direction of arrow 40 of Figs. 37, 38 and 39.

Fig. 41, which is a sectional view on line 41—41 of Fig. 36, shows the carrier air valve cam 576.

Fig. 42, which is a sectional view on line 42—42 of Fig. 36, shows the carrier bleeder valve cam 580 and a valve operated thereby.

Fig. 43 is a view in the direction of arrows 43 of Figs. 41 and 42.

Fig. 44, which is a sectional view on line 44—44 of Fig. 36, shows the staking switch cam 597 and switches operated thereby.

Fig. 45 is a view in the direction of arrow 45 of Fig. 44.

Fig. 46, which is a sectional view on line 46—46 of Fig. 36, shows a wire guide air valve cam 535 and a valve operated thereby.

Fig. 47, which is a sectional view on line 47—47 of Fig. 36, shows the armature chucking cam 476 and a valve operated thereby.

Fig. 48, which is a sectional view on line 48—48 of Fig. 36, shows the armature turning air valve cam 514 and a valve operated thereby.

Fig. 49, which is a sectional view on line 49—49 of Fig. 36, shows the armature turning bleeder valve cam 520 and a valve operated thereby.

Fig. 50 is a view in the direction of arrow 50 of Figs. 48 and 49.

Fig. 51 is a view in the direction of arrow 51 of Fig. 1, and shows a portion of the conveyor mechanism diagrammatically.

Fig. 52 is a view in the direction of arrow 52 of Fig. 51.

Fig. 53 is a detail of the driving mechanism shown in Fig. 51 as viewed in the direction of arrow 53 of Fig. 52.

Figure 54:
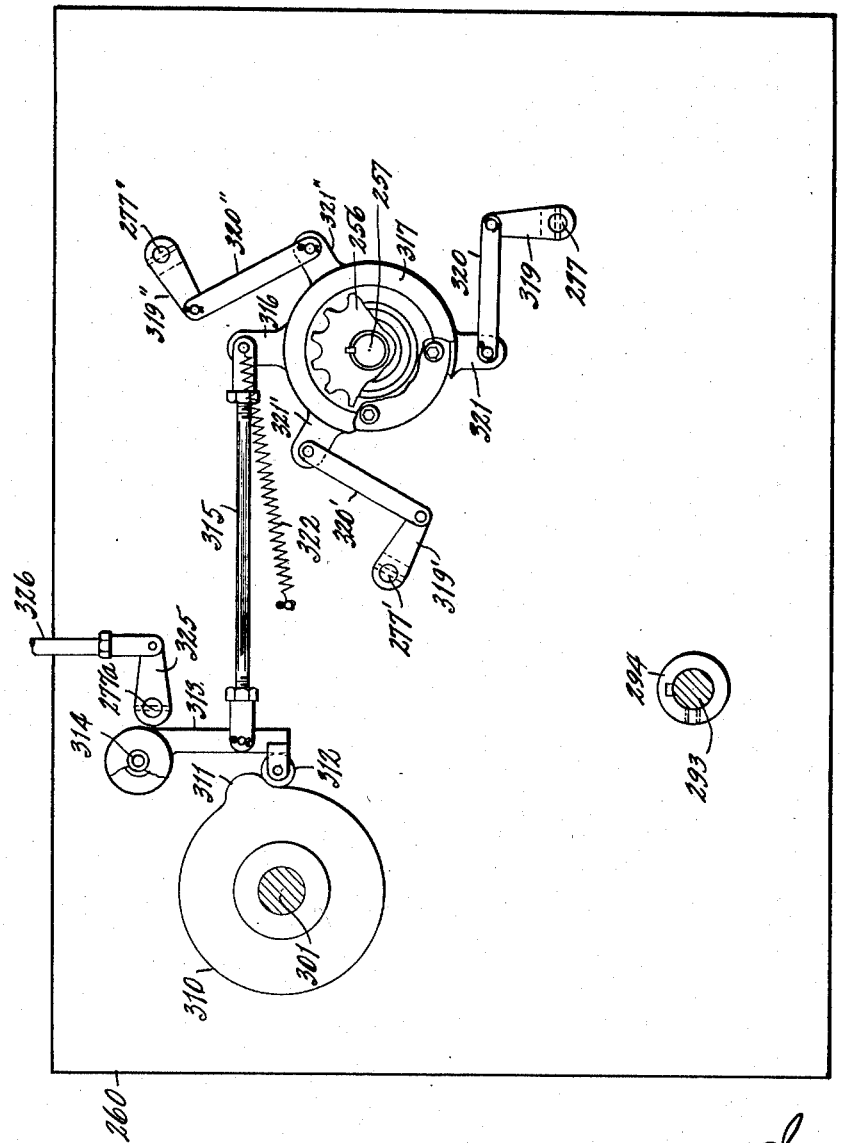

Fig. 54 is a view in the direction of arrow 54 of Fig. 52.

Figure 55:
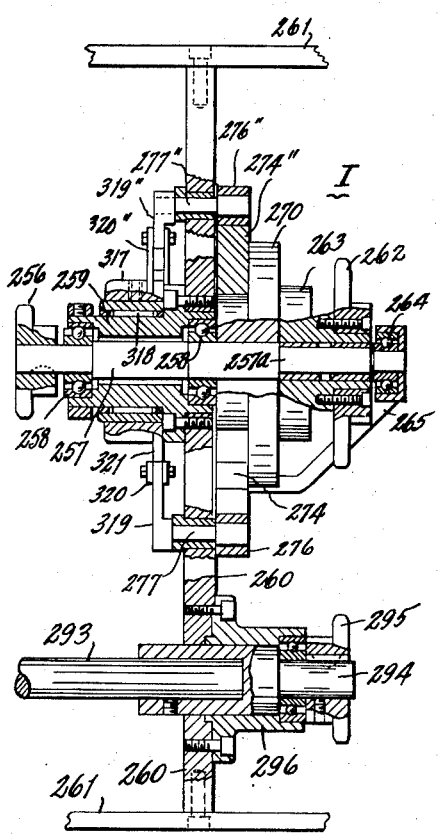
Figure 56:
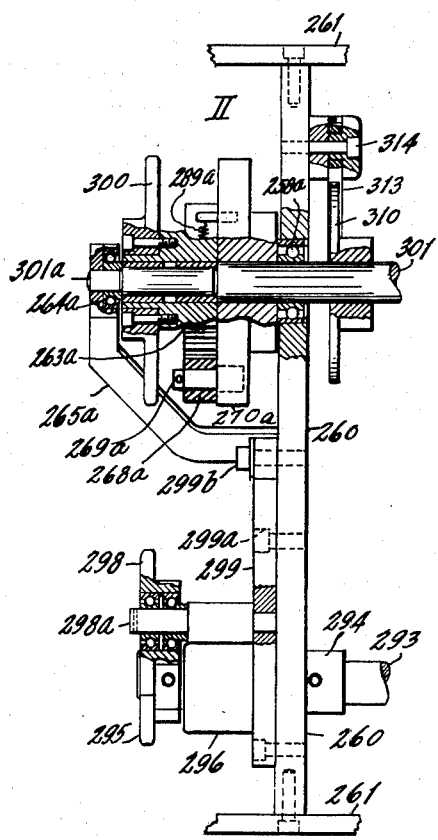

Figs. 55 and 56 are sectional views taken, respectively, on the lines 55—55 and 56—56 of Fig. 53.

Figure 58:
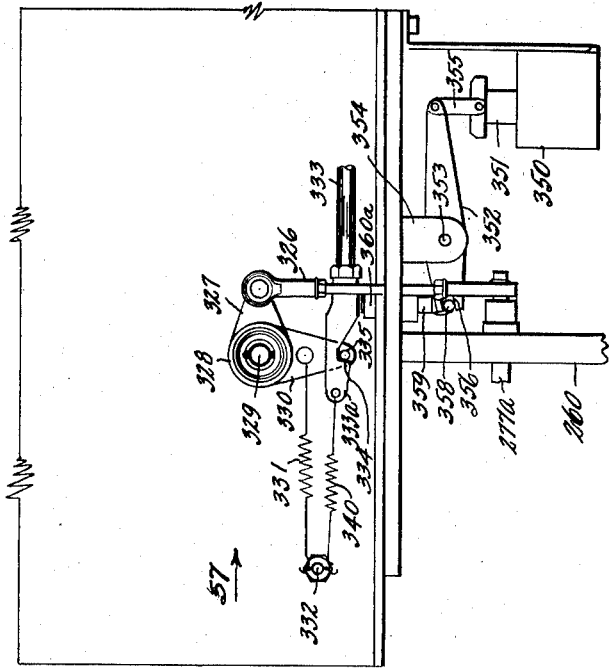
Figure 57:
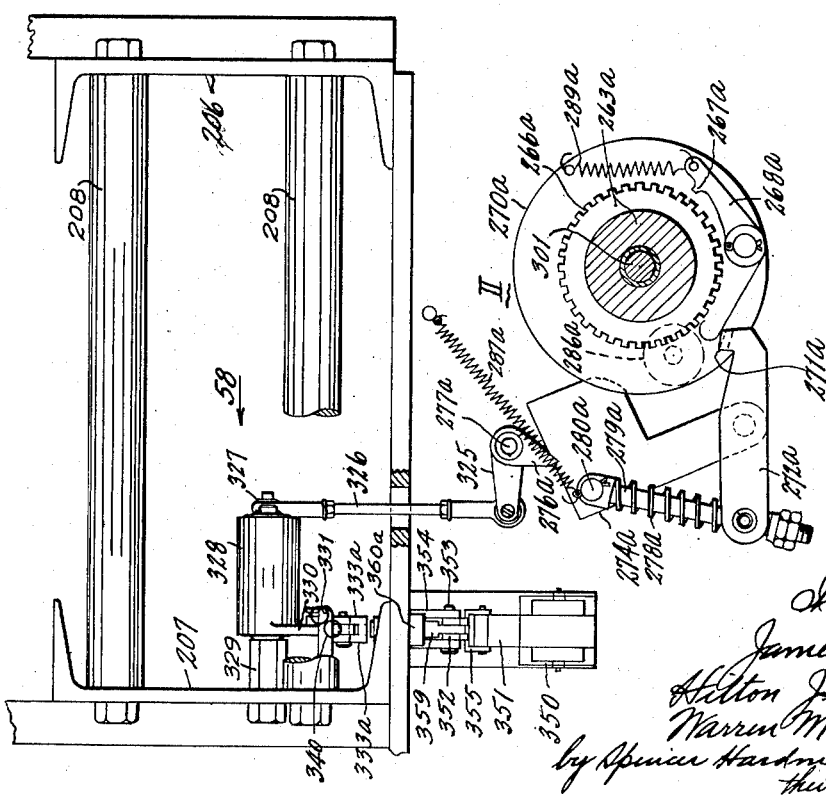

Fig. 57 is a diagram of control of clutch II of Fig. 53, a portion thereof being a view in the direction of arrow 57 of Fig. 58.

Fig. 58 is a fragmentary view in the direction of arrow 58 of Fig. 57.

Figs. 59 through 66 are fragmentary perspective views showing steps in the process of locating lead wires and staking them into notches of commutator bars.

Figure 67:
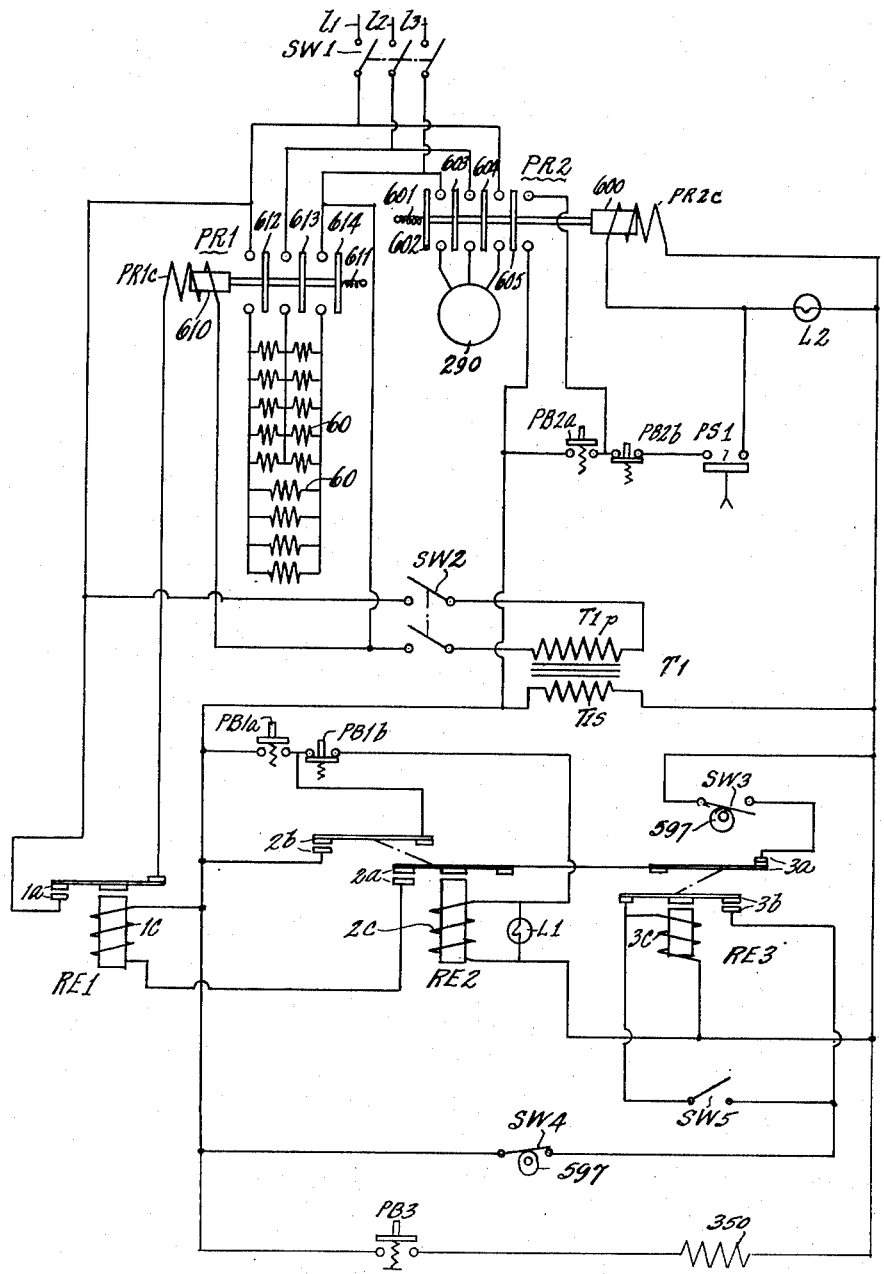

Fig. 67 is a wiring diagram of electrical controls of the machine.

Fig. 68 is a cam chart.

Referring to Fig. 1, a front plate 10, which supports an arcuate rim 10a, and a back plate 11, which is circular in shape to conform to the rim 10a, are supported, as shown in Fig. 13, by a base plate 12 supported by legs 13 braced by members 14. As shown in Fig. 8, plates 10 and 11 are secured in spaced relation by rods 15 and by the combination of rods 16 with a shell 17 attached to plate 10. Near their peripheries, as shown in Fig. 1, rim 10a and plate 11 are joined by bars 18 and these parts receive curved cover plates (not shown) in order to enclose operating mechanisms located between plates 10 and 11. As shown in Fig. 16, plate 10 has a central opening from which extend radially a plurality of notches 20, one of them being shown in Fig. 9. As shown in Figs. 8 and 9, rim 10a has in alignment with notches 20 radially extending oblong holes 21 in alignment with similar holes 22 in bars 23 (welded to rim 10a) which screws 24 attach to plate 10. In alignment with notches 20 bar 10 provides grooves 25 (Fig. 9) each receiving a wire staker bar 26 (Fig. 8) whereby these bars are guided for radial movement by the plate 10.

Referring to Fig. 2A, each staker bar 26 is received by a groove in a wire guide bar 27. The bars 27 are located between retainer plates 28 which screws 29 (Fig. 2) secure to the plate 10. Each bar 26 (Fig. 8) carries a staker blade 30 for forcing or staking an armature lead wire into a notch provided in a segment of the commutator C mounted on the shaft S of the armature A (Fig. 8, lower right).

Normally the bars 26 and 27 are retracted so that there is a space at the lower end of each notch 20. These notches 20 receive pairs of mechanically operated fingers $h$ and $g$ (Fig. 8) to be described which move from the rear to the front of plate 10 and grasp armature coil lead wires and locate them in equi-angularly spaced relation about a commutator. After the pairs of fingers $h$ and $g$ have grasped the wires, the fingers move left so that the fingers are at the left of plate 10. Then the wire guide bars 27 move radially toward the commutator C while the blades 30 remain in outer position (up in Fig. 8) during the first portion of the radial movement so that the grooves 27a in bars 27 (see Fig. 2), through which the blades 30 had previously extended, are open to receive the wires positioned by the fingers. The bars 27 move radially toward the commutator to position the wires close to the commutator, the armature A having moved left. The armature is rotated to cause the proper segments of the commutator to be aligned with the wires. The blades 30 move inwardly to force or stake the wires into the notches of the commutator segments then aligned with the wires and cutter blades 31 engage the portions of the wires projecting to the left of the notches N and cut off the excess wire.

Referring to Fig. 7 in which details of a bar 27 are shown, groove 27a in bar 27 receives blade 30 (Fig. 8). Flanges 27b are received under plates 28 (Figs. 7C and 7D) which guide bars 27 for radial movement toward the center of plate 10. When the bars 27 are moved maximum distance toward the center of plate 10, they fit together as indicated in Fig. 7, the lug 27c being close to lug 27d of an adjacent bar 27 (indicated by dot-dash lines), the lug 27d of bar 27 being close to a lug 27c of another adjacent bar 27. Thus the bars 27 come close together to provide extensions of their grooves 27a for the guidance of a wire which the blade 30 (Fig. 8) pushes into an aligned commutator bar notch. Each lug 27d has a recess 27e to provide clearance for a wire located in a commutator bar notch next to the one which is aligned with the groove 27a, said wire having been secured by a previous operation close to that commutator bar but projecting slightly therefrom until, by a subsequent operation of trimming the commutator, it is cut off. The machine disclosed herein operates upon an armature whose core has 14 slots into which 14 double wound coils have been placed, there being two active coil sides in each slot. As each double wound coil has 4 lead wires, the total number of lead wires is 56. By a previous operation of assembling the coils with the armature core, 28 of these lead wires have been staked into the bottom respectively of notches of 28 commutator bars which the commutator provides. The lead wires previously staked are the ones leading from those portions of the coils which are innermost, hence these lead wires are called bottom or inner leads. The other leads are called the top or outer leads. Two of them extend from each core slot. In one operation of the disclosed machine, 14 of the top lead wires (one extending from each core slot) are staked into 14 notches of alternate commutator bars. In one operation of another similar machine, the other 14 top lead wires are staked into the slots of those commutator bars alternating with those bars which had previously received top lead wires.

Each staker bar 26 (Figs. 7C–D–E) is received by a groove 27g of a bar 27 (Fig. 7B) and its flanges 26a are received in a groove 25 of plate 10 (Fig. 9). Thus plates 28 retain bars 27 and bars 27 retain bars 26. The groove 26b of bar 26 receives staker blade 30 (Figs. 7C and 7D) and screws 26c passing through blade 30 and received by counterbored, tapped holes 26d in bar 26 secure the blade 30 to the bar 26. The cutter 31 (Fig. 8) is received by a groove 26e and is retained by a screw 26f (Fig. 8) received by a counterbored, tapped hole 26g (Fig. 7C) having a head which engages the cutter. Cutter 31 is clamped by a screw 26h against blade 30 (Fig. 8), said screw being retained in clamping position by a lock nut 26i.

The mechanism for moving the wire guide bars 27 radially comprises a cylinder 32 (Fig. 17) supported by a plate 33 supported by brackets 34 attached to rear plate 11. Cylinder 32 receives a piston 35 connected by a rod 36 with a bar 37 connected with a pin 38 which supports rollers 39 (Fig. 18) which roll in grooves 40 provided by rails 41. Pin 38 is connected by link 42 with a lever 43 attached to a shaft 44 journaled in bearing members 45 provided by plates 11 and 10. As indicated in Fig. 16, shaft 44 is connected with a gear 46 meshing with a ring gear 47 which, as shown in Fig. 8, is journaled on a portion of the shell 17. Gear 47 drives gears 48 connected with shafts 49 which, as shown in Fig. 5, are journaled in bearings 50 received by plate 10 and in bearings 51 received by bearing retainers 52 attached to plate 10. Each shaft 49 drives a gear 53 meshing with a rack 54 attached to a bar 27. As shown in Figs. 2 and 4, there are 10 gears 48 driving through shafts 49, 10 gears 53 meshing with racks 54, and four of the gears 53 mesh with gears 55 which mesh with four of the racks 54. Thus, motion is transmitted by the ring gear 47 concurrently to the racks 54 and causes them to move inwardly by left movement of the piston 35 which causes clockwise movement of gear 46 (Fig. 16) which causes counterclockwise movement of gear 47 and clockwise movement of each gear 48 and therefore, as viewed in Figs. 2 and 4, counterclockwise movement of each gear 53, four of which cause clockwise movements of gears 55 which are connected therewith. Therefore the wire guide bars 27 move inwardly to receive wires located by pairs of fingers h and g when the piston 35 moves left as viewed in Fig. 17. As the bars 27 move inwardly as shown in Fig. 8, a screw 56 carried thereby engages the inner ends of slots 57 in bars 26 and causes the latter to move with it to a position close to the commutator C. Thereafter the bars 26 are moved further inwardly while bars 27 remain fixed through the operation of solenoids 60 which are mounted on the shell 17 as shown in Fig. 6. Each solenoid 60 has an armature 61 (Fig. 8) connected by link 62 with a lever 63 pivoted at 64 on a bracket 65 attached to rear plate 11 and connected by a link 66 with a bar 26. Therefore, as bars 27 move inwardly, they first receive the wires in their notches and then pick up the bars 26 and cause the solenoid armature 61 to move close to the solenoids. This movement is opposed by springs 67 each of which surrounds a rod 68 sliding through a hole in bracket 65 and connected with levers 63. Spring 67 is located between the lug 65a of bracket 65 and a shoulder 68a of rod 68. The upper position of the bar 26 is determined by the engagement of lever 63 with a stop screw 69 which is attached to the bracket 65. Therefore, when staking is to be effected by the solenoids, the heads of the armatures 61 are close to the solenoid magnet cores so that relatively great magnetic pull can be effected to force the wires into the commutator segment notches while the wire guide bars 27 remain stationary. As shown in Fig. 6, the wiring, which makes connection with the solenoid coils, is housed in a conduit 70 supported by the shell 17.

Referring to Fig. 8, the plate 10 supports the flange 71 of a tube 72 which is received by a hole at 73 in plate 11 and which is retained by a nut 74 threaded on the tube 72. Tube 72 receives a tube 75 which guides a horizontally movable rod 76, adjacent the right end of which, the armature shaft S is normally positioned. Rod 76 has a central recess 77 for receiving a rod 78 integral with a screw 79 threaded through a bracket 80 attached to plate 11. Rod 76 provides a groove 81 for receiving pins 82 which, as shown in Fig. 14, are carried by a lever 83 supported by a bracket 84 for rotation on an axis 85. Lever 83 is connected by a link 86 with a lever 87 integral with a hub 88 pivoted at 89 on brackets 90 supported by plate 11 and having a lever arm 91 connected by link 92 with a lever 93 pivotally supported at 94 by a bar 14 and carrying a follower roller 95 urged by springs 96 connecting lever 93 with plate 12 against a cam 97 supported by a cam shaft 98 operated in a manner to be described.

Tube 72 supports a sleeve 100 to which a screw 101 attaches a collar 102 having a groove 103 (Fig. 22) which receives pins 104 carried by the arms 105 of a lever 106 which, as shown in Fig. 21, is pivotally supported at 107 by brackets 108 carried by a base plate 12. As shown in Fig. 26, lever 106 is connected with an adjustable extension 106a carrying a pin 109 connected by a link 110 with a lever 111 pivoted at 112 upon a bracket 113 attached to plate 12. Lever 111 carries a cam follower roller 114, which a spring 106b attached to lever 106 and a fixed part urges into engagement with a cam 115 which, during a part of its counterclockwise rotation, will allow the levers 111 and 106 to be moved clockwise by spring 106b and will effect counterclockwise movement of these levers to return them to normal position.

The sleeve 100 supports a sleeve 120 providing a groove 121 for receiving pins 122 (Fig. 22) carried by a lever 123 pivoted at 124 on brackets 125 supported by plate 12. Lever 123 is connected by a pin 126 with a rack 127 retained (by a roller 128 pivoted on a pin 129 carried by lever 106) in mesh with a gear 130 attached to a shaft 131 pivotally supported by lever 106 and connected with a lever 132 connected by link 133 with a lever 134 whose hub is pivoted at 135 (Fig. 23) on lever 106 and is connected with another lever 136 connected by a link 137 with a lever 138 which, as shown also in Fig. 24, is pivoted at 139 upon a bracket 140 supported by base 12. Lever 138 carries a follower roller 140 for engaging a cam 141 which is rotated by a shaft 98. Lever 138 is pivotally connected at 142 with a rod 143 which extends through a bushing 144 threaded into a tube 145 connected by pin 146 (Fig. 25) with a lever 147 pivotally supported at 148 as shown in Fig. 21, carrying a follower roller 150 for engaging a cam 151 driven by the shaft 98. A spring 152 within the tube 145 and surrounding the rod 143 and confined between the lower end of tube 145 and a shoulder 143a of rod 143 serves to urge the follower rollers 140 and 150 against cams 141 and 151, respectively.

A short sleeve 153 (Figs. 8, 8A, 21 and 22) which is slidable on tube 72 has integral pins 154 which, as shown in Figs. 21 and 22, are connected by links 155 and pins 156 with levers 157 pivotally supported by pins 158 carried by the forks 105 of lever 106. Levers 157 are connected by pins 159 with a link 160 connected with a lever 161 pivotally supported at 162 by a lever 106 and connected by a link 163 with a lever 164, which, as shown in Fig. 27, is integral with a hub 165 (see also Fig. 23) supported by rod 166 carried by brackets 167 supported by plate 12. Hub 165 has an integral lever arm 168 connected by link 169 with a lever 170 pivoted on a rod 171 supported by a cross bar 14 as shown in Fig. 23. Lever 170 carries a follower roller 172 urged by a spring 164a (connecting lever 164 with a fixed part) into engagement with a cam 173 driven by shaft 98.

Referring to Fig. 8 and to Fig. 8A (on same sheet with Figs. 26 and 27), sleeve 120 has a flange 120a to which screws 120b attach brackets 120c supporting pins 120d, each connected by an adjustable link a and a pin b with a lever c to which there is fixed a fulcrum part d received by a notch 100a in the flange 100b of tube 100 and having a hook which receives a wire ring e received by an annular groove in flange 100b. The ring e is retained by a washer f attached to flange 100b and having notches each for receiving a part d. Each of the screws e' retains part d on ring e. Lever c has, at its right end (Fig. 8) or upper end (Figs. 10–12) a hook g for receiving an armature coil lead wire w which is caused to move into the hook g by means to be described. By movement of a bar h from the position shown in Fig. 12 to the position shown in Fig. 11, the wire w is retained within the hook g and is gripped by blunt edges g' and h' of the hook and bar.

Bar h slides on lever c and has a slot i receiving a screw j threaded into lever c. Bar h has a cylindrical part k received in a socket l of lever c. Socket l receives a spring m surrounding a rod n attached to bar h and to a pin o. Spring m being under compression, urges pin o against a bifurcated arm p of a sleeve q slidable on tube 72 and connected by pin r with tube 75 which is connected by pin s with sleeve 153. Slots s' in tube 72 provide clearance for pin s. Slots r' in tube 72 provide clearance for pin r.

Lever c and bar h thus serve as fingers for grasping the wire lead w of an armature coil. When sleeves 153, 192, 120, 100 and q move together to the right, the fingers move to the front (right) of plate 10. When sleeve 120 moves right relative to sleeve 100, the fingers are moved closer to the armature shaft. When the armature is rotated clockwise as viewed from the front of the machine or toward the left in Fig. 8, certain armature coil leads are received by the hooks g while bars h are retracted as shown in Fig. 12. Movement of sleeve q to the right relative to sleeve 100 allows the springs m to move the bars h to the positions shown in Fig. 11 to cause the wires w to be grasped by the fingers. The fingers are caused to move up and back of plate 10 so that the wire guide bars 27 may move radially toward the armature to locate the wires grasped by the fingers.

Cam 115 (Fig. 26) and spring 106b control longitudinal movements of collar 102 (Figs. 8 and 8A). When collar 102 moves right, it engages sleeve 120 to move it right while fulcrum ring e moves right since it is supported by sleeve 100 to which collar 102 is attached. Sleeve q moves with sleeve 100 because collar 102 is connected with sleeve 153 through links 155 (Figs. 21 and 22) and sleeve 153 is connected by pin s, tube 75 and pin r with sleeve q. Sleeve 120 can be moved independently of sleeve 100 by cam 141 and rod 143 (Figs. 24, 25) to effect lowering or raising of the fingers h and g as viewed in Fig. 8, to move these fingers closer to or away from the armature A. When collar 102 moves to engage sleeve 120, a space is left between collar 102 (and sleeve 100) and the sleeve 153. So that sleeve 153 can be moved right, by spring 164a (Fig. 21), when permitted to do so by cam 173 (Fig. 27), spring 164a urges links 163, 160 (Fig. 21) upwardly, lever 157 clockwise and links 155 and sleeve 153 to the right, thus causing sleeve q to move right to allow spring m to force fingers h against wires received within hooks g. Thus the machine provides for movement of the fingers out and in (frontwardly and rearwardly), down and up (advancing and retracting radially of the armature) and relative to each other to grip or release the wire.

Referring to Fig. 1, a base frame 205 supports channel bars 206 and 207 which are fixed in spaced relation at intervals by spacer tubes 208 through which rods 209 extend and receive securing nuts 210. Channels 206 and 207 support brackets 211, 212, 213 and 214 and cover plates 215, 216, 217, 218. As shown in Fig. 51, these brackets support a plate 220 supporting bars 221 and bars 222. The upper run of a conveyor chain 223 (Fig. 30) is received between the bars 221 and is connected by screws 224 to a plurality of armature supports or workholders 225 provided with rollers 226 which are supported by the bars 222. The chain 223, which is double, passes around sprockets 227 at the left end of the machine as viewed in Fig. 1, which are attached to a drive shaft 228. The chains pass around similar sprockets at the right end of the machine which are attached to an idle shaft 229. Shaft 228 (Fig. 51) is supported by bearings provided by plates 230 and 231 attached respectively to channels 206 and 207. The shaft 229 is supported in a similar manner by two plates, one of which, 232, is at the right end of Fig. 1. The chains pass around sets of smaller sprockets 234 (Figs. 1 and 52). The workholders, on the lower run of the conveyor chains, are supported by virtue of engagement of their rollers 226 with bars 236 (Fig. 51) supported by a plate 237 attached at intervals to rods 238 supported by channel 207. Shaft 228 (Fig. 51) is connected with a bevel gear 240 meshing with the bevel gear 241 (Fig. 52) attached to a shaft 253 connected by a sprocket 254 and a chain 255 with a sprocket 256 shown also in Figs. 54 and 55. Sprocket 256 is attached to a shaft 257 journaled in bearings 258 (Fig. 55) supported by a bracket 259 attached to a plate 260 supported by members 261 of base frame 205. Shaft 257 is connectible with a sprocket 262 through a ⅓ revolution clutch I (Fig. 53). Sprocket 262 is attached to a disc 263 (Fig. 55) journaled loosely on the reduced portion 257a of shaft 257 which is supported also by a bearing 264 supported by a bracket 265 attached to plate 260. Disc 263 has notches 266 (Fig. 53) each adapted to receive a lug 267 of a lever 268 journaled on a pin 269 carried by a disc 270 connected with shaft 257. Disc 270 has a notch 271 for receiving a locking pawl 272 pivoted on a pin 273 attached to plate 260. Pin 273 supports also a lever 274 having a notch 275 for receiving a latch pawl 276 attached to a shaft 277. The levers 274 and 272 are urged respectively clockwise and counterclockwise by a spring 278 which surrounds a rod 279 pivoted on a pin 280 attached to lever 274 and passing through a block 281 swiveled on lever 272 by means of a stud 282 integral with the block and receiving a retaining nut 283. The expansion of spring 278 is limited by nuts 284 threaded on rod 279 and engageable with the block 281. As shown in Fig. 53, the spring 278 urges the lever 274 against the pawl 276 and urges the pawl 272 into the notch 271 of disc 270. Disc 270 which rotates counterclockwise, carries with it a pin 285 supporting a roller 286 which has engaged the lever 274 and moved it into the position shown so that the pawl 276 will retain it and the spring 278 has pushed the lever 272 counterclockwise so that it engages the periphery of the disc 270 ahead of the instant when the notch 271 becomes aligned with the end of the lever 272 so that the lever then locks the disc 270. In order that the disc 270 and the shaft 257 are rotated ⅓ revolution there are three locking levers 272 and parts associated therewith, the others being marked 272′ and 272″ and the associated parts are similarly marked. The three latch pawls 276, 276′ and 276″ are rotated clockwise simultaneously by means to be described. Therefore the pawl, such as 276, which had been latching a lever 274 will release said lever so that a spring 287, which connects pin 280 with a pin 288 attached to plate 260, will release lever 272 thereby permitting a spring 289 (which connects lever 268 with disc 270) to move lever 268 counterclockwise to cause its lug 267 to be received by a notch 266 in disc 263 when lever 272 has been retracted from the notch 271. Then the driving element 262 of the clutch I will rotate the disc 270 and the shaft 257 thereby causing it to be rotated 120° counterclockwise. Before the end of this movement, the roller 286 will engage lever 274′, to place it in a position relative to disc 270 which is the same as lever 274 as shown in Fig. 53. It is therefore apparent that each time the three pawls 276, 276′ and 276″ are rotated clockwise, the clutch will be tripped and engaged and will automatically disengage at the end of ⅓ revolution. As viewed in Fig. 51, gear 256 rotates counterclockwise and causes, through the mechanism shown, counterclockwise rotation (Fig. 52) of sprockets 227 so that the upper run of the conveyor moves toward the left in Fig. 52 and toward the left in Fig. 1. During each ⅓ revolution of shaft 257, the conveyor moves a distance equal to the center-line spacing of the work-holders 225.

Referring to Fig. 36, an electric motor 290 drives, through a speed reducer which includes gears 291, 292, a shaft 293 connected with a sprocket 295 through a coupling shaft 294 (Fig. 55) which is journaled in a bracket 296 attached to plate 260. Sprocket 295 receives a chain 297 connected with sprocket 262 and with a sprocket 300. As shown in Fig. 53, the chain 297 is engaged also by an idle or slack take-up sprocket 298 rotatably supported by bracket 299 pivoted on a screw 299a attached to plate 260 and retained in adjusted position by a screw 299b passing through an arcuate slot 299c of the bracket and threaded into the plate 260. Sprocket 300 is connected with a shaft 301 by a clutch II constructed like clutch I except that it has only one locking pawl 272a. (Parts of clutch I like parts of clutch II are marked with the same reference numbers with "a" affixed.) Therefore clutch II is a one-revolution clutch. As shown in Fig. 56, shaft 301 has a reduced portion 301a which is supported by a bearing 264a in a bracket 265a attached to plate 260 and by a bearing 258a in plate 260 and by other bearings supported by brackets 302 (Fig. 36) which are supported by the base frame 205. Shaft 301 carries a number of cams to be described and a sprocket 303 is connected by a chain 304 with a sprocket 305 attached to shaft 98.

In Fig. 54, shaft 301 rotates clockwise a cam 310 having a lobe 311 for engaging a roller 312 carried by lever 313 pivoted at 314 on plate 260 and connected by a link 315 with an arm 316 extending from a hub 317 which, as shown in Fig. 55, is journaled on a needle-bearing 318 supported by the sleeve 259. Hub 317 is connected with pawl shafts 277, 277′ and 277″ through levers 319, 319′ and 319″, links 320, 320′ and 320″ and arms 321, 321′ and 321″, respectively, said arms extending from the hub 317. A spring 322 urges the hub 317 counterclockwise and the roller 312 against the cam 310. Engagement of the lobe 311 with roller 312 causes the shafts 277, 277′, 277″ to rotate counterclockwise in Fig. 54 and clockwise in Fig. 53. Therefore, once during a revolution of shaft 301, the clutch I is tripped by momentary retraction of the pawls 276, 276′ and 276″. The tripping of clutch II is effected by a momentary clockwise movement of pawl 276a which is attached to a shaft 277a which, as shown in Fig. 54, is connected with a lever 325 connected with a link 326 which, as shown in Figs. 57 and 58, is connected with a lever 327 integral with a hub 328 journaled on a stud 329 attached to channel 207 and integral with a lever 330 which a spring 331 connecting said lever with a pin 332 urges clockwise as viewed in Fig. 58, thereby urging rod 326 (Fig. 57) downwardly to urge the pawl 276a toward the lever 274a of clutch II. It is therefore apparent that counterclockwise movement of lever 327 (in Fig. 58) is required to effect tripping of the clutch II. This movement of lever 327 is effected by right movement of a rod 333 having a hook 334 for engaging a pin 335 carried by lever 330. Rod 333 is attached to a manually controlled lever 336 pivoted at 337 (Fig. 1). When lever 336 is moved clockwise from the position in Fig. 1 and allowed to remain in that position, the clutch II will remain engaged; but, if the lever 336 is released, a spring 340 will return rod 333 to position, permitting spring 331 to return latch 276a (Fig. 57) to clutch-disengaging position, and clutch II will open at a predetermined time in a revolution of cam shaft 301 so that this shaft will stop at a certain home position.

For purposes of emergency control, by the closing of a switch, a solenoid 350 is energized and causes downward movement of its armature 351 and clockwise rotation of a lever 352 connected at 353 on a bracket 354 and connected with the armature by a link 355. Lever 352 has a notch 356 for receiving a pin 358 on the end of a plunger 359 guided by a bushing 360a. When solenoid 350 is energized, plunger 359 moves up to engage rod 333 and to disconnect the hook 334 of rod 333 from pin 335 so that the lever 330 can be returned by spring 331 to position for causing clutch II to be disengaged.

Referring to Figs. 28-30, a plate 360 supported by channels 206, 207 (Fig. 1) supports two bars 361 (Fig. 29) which support a plate 362 which supports rails 363 which guide for horizontal movement a carrier 364 supported by rollers 365 (Fig. 30) which rest on the plate 362. Carrier 364 supports a bracket 366 having a notch 367 which receives a grooved collar 368 secured by a nut 369 to a rod 370 connected with a piston 371 in a cylinder 372 supported by plate 360. Admission of pressure fluid to the right end of cylinder 372 causes the plate 364 to move left and the amount of left movement is determined by a stop lever 373 pivoted at 374 on a bracket 375 attached to plate 360 and connected by a pin 376 with a link 377 which, as shown in Fig. 38, is attached to a lever 378 pivoted at 379 on a bracket 380 attached to plate 464a attached to plate 360 and carrying a roller 381 for engaging a cam 382 driven by a shaft 301. A spring 383 (Fig. 30) which urges lever 373 upwardly causes roller 381 to follow the cam 382 which is called the carrier stop cam.

The carrier 364 supports a relatively fixed bracket 385 and a relatively movable bracket 386 supporting a collet chuck comprising an inner member 387 and a relatively movable outer member 388 which on being moved to the left relative to member 387 to cause the latter to grip the armature shaft S, after the chuck has been moved left to receive the shaft. The member 388 is confined between a ball thrust bearing 389 and a washer 390 retained by a bushing 391 screwed on the member 386. Bushing 391 carries a disc 392 adapted to engage the left end of chuck member 387. Member 387 is threadedly connected with a shaft 393 having a longitudinal spline connection with member 388 through a key 394. Member 388 is journaled in bracket 386; and shaft 393 is journaled in a bearing 395 provided by bracket 385 and passes through a thrust bearing 396 in member 385, through a spacer 397 and has a threaded portion which receives nuts 398 and 399 which secure between them a gear 400. Toggle links 401 and 402 connected, respectively, with member 395 and a plate 403 attached to bracket 386, are connected by a link 404 with a bar 405 connected with a rod 406 connected with a piston 407 in a cylinder 408 supported by plate 409 supported by plates 410 and 411 supported by the carrier 364. Downward movement of piston rod 406 causes movement of chuck member 388 relative to chuck member 387 to cause the latter to clamp the armature shaft. This gripping action is caused to take place after the carrier has been moved left so that the shaft S will be received by the chuck.

Before the armature is received and gripped by the chuck, it is located, as shown in Fig. 30, between stop rod 76 associated with the lead staking apparatus and a stop rod 415 received within the chuck and the shaft 393 and supported by a bracket 416 attached to plate 362; the rod 415 has a threaded portion 417 screwed through the bracket 416 and receiving a nut 418 which secures the rod 415 in longitudinally adjusted position.

Before the armature shaft S is engaged by the chuck the armature core AC must be clamped against the workholder 225. For this purpose, an air cylinder 420 containing a piston 421 connected with a rod 422 is mounted on a plate 423 supported by brackets 424 supported by plate 362. As shown in Figs. 30-32, rod 422 is attached to a frame 425 having pilot bushings 426 receiving pilot rods 427 attached to plate 423. Frame 425 carries a rod 430 pivotally supporting pairs of levers 431 and 432 connected together by ribs 431a and 432a (Fig. 34), respectively, and providing teeth 433 and 434, respectively, which are received by certain spaced slots of the armature core which is supported by the workholder 225. Rods 437a and 437b connected, respectively, by pins 438 (Fig. 34) with levers 431 and 432 pass through holes in a plate 439 attached to plate 425 and are threaded to receive nuts 440a and 440b, respectively. Springs 436a and 436b which surround rods 437a and 437b, respectively, urge the levers 431 and 432 downwardly normally until stopped by engagement of nuts 440a and 440b with plate 439. Rods 437b are longer than rods 437a and levers 432 are longer relative to pin 430 than levers 431 and nuts 440a and 440b are adjusted so that when these nuts engage plate 439, teeth 434 hang down further than teeth 433. Therefore during descent of plate 425 to armature core clamping position, as shown in Figs. 31 and 32, the teeth 434 are the first to be received by an armature core slot and to engage an armature core tooth while teeth 433 may be riding on an armature core tooth periphery. Thereafter, as plate 425 descends, levers 432 move up relative to plate 425 until rib 432a is engaged by plate 425 as shown in Fig. 32. Consequently, the teeth 434 move with the plate 425 and the armature core is caused to turn, if necessary, to permit teeth 433 of levers 431 to be received in a core slot spaced a predetermined angular distance from the core slot which had received teeth 434 of levers 432. Thus the armature core is automatically turned while resting on workholder 225 when necessary to locate the core properly to receive teeth 434 and 433 just as plate 425 begins to clamp the armature core against holder 225.

During retraction of the plate 425 upwardly, the levers 432 are latched against the plate 425 by a latch 441 pivoted at 442 on plate 439 and urged clockwise by a spring 443 retained in a tube 444 attached to plate 439 and urging upwardly a plunger 445 which engages latch lever 441. Near the end of upward movement of plate 425, a lug 446 of lever 441 engages plate 423 to retract the lever 441 from engagement with rib 432a which connects levers 432 so that springs 436b are released to return the levers 432 to normal position with their teeth 434 below the teeth 433 of levers 431.

The piston 421 in cylinder 420 (Fig. 28) is caused to move down against an action of a spring within the cylinder by the admission of air through a valve 450 connected with a source of compressed air by a pipe 451. Valve 450 has an actuator 452 and supports a bracket 453 pivotally supporting a lever 454 connected with a shaft 455 carrying a lever 456 connected by a link 457 with a lever 458 connected with a shaft 459 supported by brackets 424 and connected with a lever 460 connected by a link 461 which, as shown in Fig. 39, is connected with a lever 462 pivotally supported at 463 by a bracket 464 attached to plate 464a and carrying a roller 465 engageable with a cam 466 driven by a shaft 301. When the low land of cam 466 is in position to receive the roller 465, a spring 468a (Fig. 30) connecting lever 460 with a fixed part causes clockwise rotation of lever 454 to push left the actuator 452 against the action of a spring (not shown) to open the valve 450.

Piston 407 (Fig. 30) in cylinder 408 is also urged upwardly by a spring (not shown) into chuck releasing position. Admission of pressure fluid to the upper end of cylinder 408 to effect the chucking operation is controlled by valve 470 (Fig. 47) supported by a bracket 471 attached to the channels 206, 207 and pivotally supporting at 472 a lever 473 connected by a link 474 with the actuator of the valve 470 and carrying a roller 475 controlled by a cam 476 driven by a shaft 301. A spring 477 which surrounds a rod 478 attached to lever 473 and passing through a lug 479 of the bracket 471 urges the roller 475 against the cam 476. Nuts 480 threaded on rod 478 limit the expansion of spring 477. When the high land of cam 476 engages roll 475, valve 470 is opened to cause piston 407 to move down to close the collet chuck.

The mechanism for turning the armature shaft after it is gripped by the collet chuck comprises a cylinder 481 (Figs. 28-30) supported by a plate 482 supported by frame members 483 and 484 supported by carrier 364. A piston 485 in cylinder 481 is connected by a rod 486 with a bar 487 connected by links 488 with a lever 489 attached to a shaft 490 journaled in a bearing 491 (Fig. 28) retained by a plate 492 attached to plate 411 and journalled in a bearing (not shown) provided by plate 484. Lever 489 provides a gear segment 493 which meshes with gear 400 which is connected through the shaft 398 with the collet chuck. Lever 489 is provided with stop surfaces 489a and 489b for engagement with a stop lever 495 pivotally supported at 496 by bracket 497 attached to plate 411 and adapted to be engaged by a roller 498 carried by a lever 499 attached to a shaft 500 journaled in bearings provided in brackets 501 (Fig. 28) attached to a plate 361. Shaft 500 provides a lever 502 connected by a link 503 with a lever 504 which, as shown in Fig. 37, is connected with a shaft 505 supported by bracket 506 and carries a roller 507 for engaging a cam 508 driven by a shaft 301. A spring 495a (Fig. 29) urges lever 495 into the position shown in which a surface 495b thereof engages the bracket 497. Roller 498 actually touches lever 495 since levers 502 and 504 and link 503 gravitate downwardly so that actually the roller 507 is normally out of engagement of the cam 508. When lobe 508a of cam 508 engages roller 507, lever 495 is moved so that it is retracted from surface 489a of lever 489 so that a limited rotation of gear 400 and the armature shaft gripped thereby, can take place until surface 489b engages lever 495. When lobe 508b of cam 508 engages roller 507, lever 495 is retracted entirely from lever 489 so that further rotation of the armature shaft can be effected until piston 485 bottoms in cylinder 481.

The admission of pressure fluid to the ends of cylinder 481 is controlled by a valve 510 (Fig. 48) whose operating member is connected by a link 511 with a lever 512 carrying a roller 513 for engaging a cam 514 driven by shaft 301. Lever 512, which is pivotally supported at 515 by a bracket 515a which supports the valve 510, is urged counterclockwise by a spring 516 surrounding a rod 517 connected with the lever 512 and passing through a hole in the lug 518 of the bracket 515a and receiving nuts 519 which limit expansion of spring 516.

As shown in Fig. 50, cam 514 is located on shaft 301 adjacent a cam 520 which, as shown in Fig. 49, engages a roller 521 carried by a lever 522 pivoted at 523 on bracket 515a and engageable with an actuator 524 of a valve 525 which, when opened, bleeds pressure fluid from the upper end of the armature turning cylinder 481 at a time when its control valve 510 has been located in neutral position by cam 514 so that pressure of lever 489 on stop lever 495 (Fig. 29) is relieved and piston 485 does not move down when lever 495 moves from surface 489a or from surface 489b as will be explained later with reference to the cam chart, Fig. 68.

The admission of pressure fluid to the ends of cylinder 32 which operates the mechanism for moving the wire guide bars 27 (Figs. 2 and 4) is controlled by a valve 530 (Fig. 46) supported by a bracket 533a and having its operating member connected by a link 531 with a lever 532 pivoted at 533 and carrying a roller 534 for engaging a cam 535 driven by shaft 301. Roller 534 is urged against the cam 535 by a spring 536 surrounding a rod 537 connected with lever 532 and passing through a hole in a lug 538 of the bracket 533a and receiving nuts 539 which limit expansion of the spring 536. Motion of piston rod 36 to the left in Fig. 17 is limited by the engagement of bar 37 with the bifurcations 540 of a lever 541 pivoted on a rod 542 supported by plates 41 and connected by link 543 with a lever 544 pivotally supported by a bracket 545 and connected by a link 546 with a lever 547 attached to a shaft 548 which, as shown in Fig. 19, is supported in bearings 550 provided by brackets 549. Shaft 548 is connected with a lever 551 connected by a link 552 with a lever 553 pivotally supported at 554 by a bracket 555 and carrying a roller 557 for engaging a cam 558 driven by shaft 301. When the roller 557 is engaged by the high land of the cam 558, the stop lever 541 will be held in the position shown to limit left movement of the bar 37 and to limit inward movement of the bars 27 to that required to locate the lead wires close to the armature but not so close as to drag thereon when the armature is turned to locate commutator segment slots in alignment with the wire ends that are to be staked therein. Cam 588 then is holding the toggle levers 543, 544 in alignment against the action of a plunger 559 (Fig. 17) which is urged downwardly by a spring 560 in a retainer 561. When the low land of cam 558 (Fig. 19) is in position to receive the roller 557, the spring 560 is released to effect counterclockwise movements of levers 544 and 541, right movement of link 546, clockwise movement of shaft 548, up movement of link 552 (Fig. 19), clockwise movement of lever 553 so that roller 557 follows the cam 558 into the low land thereof while the stops 540 provided by lever 541 will permit greater left movement of the bar 37 and greater inward movements of the bars 27 after rotation of the armature is completed and preparatory to staking.

The admission of pressure fluid to the ends of cylinder 372 (Fig. 30) is controlled by a valve 570 (Fig. 41) attached to a bracket 571 and having its operating member connected by a link 572 with a lever 573 pivotally supported at 574 by the bracket and carrying a roller 575 for engaging a cam 576 driven by shaft 301. The roller 575 is urged against the cam 576 by a spring 577 surrounding a rod 578 connected with lever 573 and passing through a lug 571a of bracket 571 and receiving nuts 579 which limit expansion of the spring 577. As shown in Fig. 43, cam 576 is adjacent to a cam 580 driven by a shaft 301 and engageable with a roller 581 (Fig. 42) carried by a lever 582 pivoted at 583 on bracket 571 which supports a valve 584 whose operating lever 585 is actuated by the lever 582. Valve 584, when opened, effects the bleeding of pressure fluid from the right end of carrier operating cylinder 372 at times when the cam 576 places valve 570 in neutral status in order that pressure of piston rod 370 (Fig. 30) on stop surfaces 373-1, 373-2, 373-3 of lever 373 is relieved and whereby, piston rod 370 does not move left in response to retraction of these stop surfaces from the path of movement of the piston rod.

A bracket 590 (Figs. 44 and 45) supports switches SW3 and SW4 whose operating members 591 and 592 are actuated by a lever 593 pivoted at 594 and urged counterclockwise by spring 595 so that a roller 596 on the lever engages a cam 597 driven by shaft 301. When, at the beginning of the machine cycle, the valley 597a of cam 597 is in position to receive the roller 596, spring 595 moves lever 593 right and causes switch SW4 (normally closed) to open momentarily to restore an electric circuit of Fig. 67 to normal status. When, near the end of the machine cycle, lobe 597b of cam 597 engages roller 596, lever 593 moves left to close normally open switch SW3 to cause energization of solenoids 60 for the staking operation.

Referring to Fig. 67, switch SW1 connects current source wires $l_1$, $l_2$ and $l_3$ with one side of each of the magnetic switches PR1 and PR2. When switches SW1 and SW2 are closed, wires $l_1$ and $l_3$ are connected with the primary winding T1p of a transformer T1 having a secondary winding T1s. The switch PR2 has a magnet coil PR2c, which, when energized, attracts armature 600 against spring action 601 to move contacts 602, 603, 604 and 605 into circuit-closing position thereby causing motor 290 to operate. Switch PS1 closes when a fluid source is operative to supply pressure fluid to the various cylinders of the machine. Switch PS1 having been closed, when push button switch PB2a is pressed, coil PR2c receives current from secondary winding T1s and effects closing of switch PR2 which holds in after push button PB2a is released since contact 605, when closed, by-passes PB2a. While the motor is running, lamp L2 burns to indicate this. The motor stops by pressing switch button PB2b.

After motor 290 is running, switch PB1a is closed to connect coil 2c of relay RE2 with secondary winding T1s. Contacts 2a and 2b of relay RE2 close. Lamp L1 burns to indicate that relay RE2 is operating. Closing contact 2b, which by-passes switch PB1a, maintains energization of coil 2c, after switch PB1a is released. When cam 597 closes switch SW3, coil 1c of relay RE1 is connected with secondary winding T1s by contacts 2a of relay RE2, contacts 3a of relay RE3 and switch SW3. Coil 1c being energized, contacts 1a of relay RE1 close to effect energization of coil PR1c of switch PR1 and armature 610 moves left against the action of spring 611 to close contacts 612, 613, 614 into circuit-closing position to connect staking solenoids 60 with the three-phase current source and the staking operation is performed.

Feeler switch SW5 (Fig. 67) is located as shown in Fig. 28, on a bracket 620 supported by bracket 424 and its actuator 621 may be engaged by a screw 622 carried by a lever 623 pivoted at 624 on bracket 620 and urged upwardly by a spring 625. Switch SW5 is normally open. If an armature core AC is on the workholder 225 (Fig. 30), the bar 439 does not move down far enough to engage lever 623 when the core is clamped by plate 425. If no core is present on the workholder at the staking station, piston 421 will bottom in cylinder 420 and bar 439 engages lever 623 to cause it to close switch SW5.

Feeler switch SW5 will remain opened at the time switch SW3 is closed by cam 597 provided an armature is in the workholder at the work station. If the workholder is empty, switch SW5 will be closed and coil 3c of relay RE3 will be connected with secondary winding T1s through switch SW5 and switch SW4. When coil 3c is energized contacts 3b close and contacts 3a open. The opening of contacts 3a prevents the staking operation by closing switch SW3. The closing of contact 3b which by-passes switch SW5 maintains energization of coil 3c until at the beginning of the machine cycle, switch SW4 is opened by cam 597. Relay RE3 returns into normal status so that a staking operation can be performed provided an armature is located in the next workholder to arrive at the staking station. If staking is not wanted after relay RE2 has been energized, switch PB1b is opened to disconnect coil 2c of relay RE2 from secondary T1s. If repetition of the machine cycle is not wanted, solenoid 350 is energized by closing of a switch PB3 so that the cam shaft will stop at the end of the machine cycle. Switch PB3 may be one of a plurality of switches in parallel, each for the control of the solenoid 350.

Figs. 59–66 were drawn from photographs of the machine showing various stages in its cycle of operations. Figs. 59 and 60 show the stage in which motion of the carrier to the left is stopped by stop 371-1 (Fig. 30). The fingers g, h are behind the plate 10. In Figs. 61, movement of the fingers in front of plate 10 has started. In Fig. 62, the carrier has moved the armature left until the carrier has been stopped by stop 371-2 and the fingers g, h have moved forward and down and they are open to receive wires w, extending generally radially from the core AC. In Fig. 63, the armature has rotated in the direction of arrow 630 to locate one wire of each pair between the fingers g, h and the fingers have somewhat loosely gripped portions of said wires near the core AC. In Fig. 64, while the carrier is still on stop 371-2, the fingers have moved radially away from the armature and part way back (left). The fingers have a tight grip on end portions of the wires. In Fig. 65, while the carrier is still on stop 371-2, the fingers have moved back of plate 10 to locate the wires for reception by notches 27a of guide bars 27 which have moved close to but not touching the commutator C. In Fig. 66, the carrier has advanced (left) to the third stop 371-3 (Fig. 30) and the armature has been rotated in the direction of arrow 631 to register, with respect to the wires as located by the bars 27, those commutator bar slots into which the wires are to be forced or staked.

In Fig. 68, which shows the timing of the various cams during one revolution of the cam shafts, figure numbers 59–66 appear on certain vertical degree lines to indicate approximately the occurrence, in the machine cycle, of the events which these figures illustrate. Line $j$—$k$ indicates that the wire-gripping fingers $g$, $h$ are in or behind the plate 10 (Figs. 59 and 60 and Fig. 8). From $k$ to $l$ the fingers move out in front of plate 10 as illustrated in Figs. 61 and 62. The fingers remain out from $l$ to $m$ and are retracted between $m$ and $n$. The fingers which are raised between $p$ and $q$ (see Fig. 61) are lowered by control of cam 141 (Fig. 24) between $q$ and $r$ to the position shown in Fig. 62. While the fingers $g$, $h$ are out and lowered, cam 173 (Fig. 27) has positioned the fingers for receiving the wires between them as shown in Fig. 62 by movement $d$—$e$. While the fingers are thus positioned from $e$ to $f$ the armature turning air valve cam 514 (Fig. 48) operates at time $r3$ to condition valve 510 to effect turning of the armature in the direction of arrow 630 (Fig. 63) to cause certain wires to be received between the fingers. At that time finger lowering cam 141 is operating to raise the fingers between times $s$ and $t$. During this finger movement, they loosely grip the wires (time $e$—$f$). While the fingers start to move in between $m$ and $n$, they are caused to grip the wires at time $g$ (see Fig. 64) and maintain grip on them to time $h$. After time $n$, when the fingers are full retracted to the rear of plate 10, they are lowered close to the commutator and at time $p4$ (cam 535), the bars 27 have been lowered relatively close to the armature as shown in Fig. 66 but not so close as to hinder rotation thereof between times $v3$ and $w3$ as effected by the armature turning air valve cam 514. As a result of this rotation, the armature is turned in the direction of arrow 631 in Fig. 66 to bring its commutator notches into alignment with the wires intended to be received by the notches. Between times $h$ and $i$, cam 173 effects release of the wires by the fingers. From time $y$ to time $z$, cam 141 effects positioning of the wires close to the commutator preparatory to staking which is effected by operation of staking switch cam 597 at time $w4$. After staking and cutting off excess wire, the finger lowering cam 141 effects raising of the fingers between $z$ and $a'$ and a jerking of the fingers, as represented by $z$—$a'$, $b'$—$c'$ to dislodge the excess of the wires therefrom.

As represented by the line beginning at $d'$, spring cam 151 (Fig. 25) conditions the spring 152 for control of the finger in and out movements and the finger lowering and raising movements by cams 115 and 141.

The stop rod 76 (Fig. 8) is caused to be advanced from $o'$ to $p'$ by cam 97 (Fig. 13). Between $q'$ and $r'$, stop 76 is retracted slightly to the left in order to make sure that there is no interference with movement of the armature by the conveyor. The stop 76 is advanced again between $s'$ and $t'$ and then retracted completely to the left between $t'$ and $u'$ to permit movement of the armature by the carrier. After the staking operation when the carrier has released the armature and has retracted, the stop 76 advances between $v'$ and $w'$ to push the armature away to the front of plate 10 preparatory to the next conveyor movement.

The hold down air valve cam 466 (Fig. 39) effects a clamping of the armature core upon the workholder 225 by the plate 425 between $c''$ and $d''$. At $e''$ the plate 425 has been elevated.

From $f''$ to $g''$ carrier air valve cam 576 conditions the carrier air valve 570 (Fig. 41) for retraction of the carrier. From $g''$ to $h''$ the carrier valve is positioned to cause the carrier to move to engage stop 373-1. The armature shaft is then received by the collet chuck. Between $h3$ and $i3$ the armature chuck cam 476 effects the gripping of the armature shaft by a collet chuck and after that the hold down plate 425 rises as represented by movement $d''$—$e''$ of cam 466. The armature remains chucked until after the staking operation and is released in response to operation of cam 476 as represented by movement $j3$—$k3$.

While the armature shaft is chucked, carrier air valve cam 576 causes between times $i''$ and $j''$ the movement of carrier air valve 570 to neutral status so that air pressure is cut off from cylinder 372, while at time $u''$ the carrier bleeder valve cam 580 (Fig. 42) conditions valve 584 for release of air pressure in the right end of cylinder 372 so that carrier stop 371-1 (Fig. 30) can be replaced by carrier stop 371-2 without any movement of the carrier. When carrier stop cam 382 (Fig. 38) has operated between times $b3$ and $c3$ to replace stop 371-1 by stop 372-2, between times $k''$ and $l''$ the carrier air valve cam 576 conditions the carrier air valve 570 for effecting engagement of the carrier with stop 372-2. While the carrier is thus positioned, the armature is turned at time $r3$ in response to operation of the armature turning air valve cam 514 in order to cause the wires to be received between the fingers which are slightly separated (see Fig. 63) as represented by function $e$—$f$ of cam 173. From $m''$ to $n''$ the carrier air valve cam 576 causes the carrier air valve 570 to be neutralized; and, at time $w''$ the carrier bleeder valve cam 580 (Fig. 42) conditions valve 584 to cause release of pressure on stop 371-2 so that the carrier stop cam 382 may operate between $d3$ and $e3$ to substitute stop 371-3 for stop 371-2. Then between $o''$ and $p''$ the carrier air valve cam 576 conditions the carrier air valve 570 (Fig. 41) to cause the carrier to move against stop 371-3 and position the work nearest to the staker for the staking operation. Between times $q''$ and $r''$ the carrier air valve 570 is conditioned for retraction of the carrier and between times $j3$ and $k3$ the collet chuck releases grip on the armature shaft.

Between $m3$ and $n3$ armature turning air valve cam 514 (Fig. 48) conditions valve 510 for causing piston 485 (Fig. 29) to push lever 489 down so that its surface 489a engages stop lever 495 then in the position shown. Between $p3$ and $q3$ the air valve 510 is neutralized and cam 520 (Fig. 49) is operating at $c4$ to effect bleeding by valve 525 of air pressure from the upper end of cylinder 481 thereby releasing pressure on lever 495. The piston 485 remains stationary while lever 495 is moved by cam 508 (Fig. 37) between times $h4$ and $i$ to retract this lever from surface 489 and place it for engagement by surface 489b. Then cam 520 closes the bleeder valve 525; and, while it is closed at $d$, air valve 510 is conditioned at time $r^3$ to admit pressure fluid to the upper end of the cylinder 481 so that lever surface 489f engages stop lever 495. This effects a turning of the armature in the direction of arrow 630 (Fig. 63) to cause certain lead wires to be received between the fingers $h$ and $g$. Between $s^3$ and $t^3$ air valve 510 (Fig. 48) is neutralized and bleeder valve 525 (Fig 94) is opened at $e^4$ so that pressure is relieved between surface 489b and lever 495 so that stop cam 500 can operate between $j^4$ and $k^4$ to retract lever 495 entirely away from lever 489 but the piston 485 does not then move down because hydraulic fluid cannot then escape from the lower end of cylinder 481. Between $t^3$ and $u^3$ cam 514 conditions air valve 510 to cause the piston 491 to move a short distance to the bottom of the cylinder 481. Between $v^3$ and $w^3$ valve 510 is conditioned for admitting air to the lower end of cylinder 481 so that piston 485 will move up to effect rotation of the armature in the direction of arrow 631 (Fig. 65) for the purpose of registering those notches of the commutator segments which are to receive the wires which are being retained by the wire guide bars 27.

The location of the wire guide bars is controlled by cam 535 (Fig. 46) which operates between $o^4$ and $p^4$ to condition valve 530 so that pressure fluid is admitted to the right end of cylinder 32 (Fig. 17) to effect inward movement of the bars 27 until such movement is prevented by the stop 540. Thus, the movement of the wire guide bars 27 is so limited that they do not touch the armature while it is being rotated during the period $v^3$ to $w^3$. Between $t^4$ and $u^4$ cam 556 (Fig. 19) effects retraction of the stop 540 (Fig. 17) so that movement of wire guides 27 continues until they move very close to the commutator just as staking takes place by virtue of operation of the stake switch cam 597 at $w^4$. Between $q^4$ and $r^4$ cam 535 (Fig. 46) conditions valve 530 to effect retraction of the wire guide bars 27 and also retraction of the staking members. Between $v^4$ and $s^4$ cam 438 operates to effect restoration of stop 540 (Fig. 17) to functioning position.

At the beginning of the machine cycle staking switch cam 597 effects at $u^4$ a momentary opening of the switch SW4 (Fig. 67) for the purpose of deenergizing coil 3c of relay RE3 in case it has been energized by virtue of closing of the feeler switch SW5 when an armature was not present in a workholder at the work station.

The armatures, whose lead wires have been fanned out radially as shown in Fig. 59, are placed upon the workholders of the conveyor which moves them toward the left in Fig. 1. After the operations performed by the machine as disclosed, the chuck releases grip on the armature shaft and the rod 72 pushes the shaft to restore the armature core to proper location on the workholder so that the conveyor can move the armature to the left end of the machine. An attendant removes and inspects the armature and passes it, if the lead wires have been properly staked, to a place where it is prepared for the next staking operation by a machine similar to the one described.

While the embodiment of the present invention as herein disclosed, constitutes a preferred form, it is to be understood that other forms might be adopted.

What is claimed is as follows:

1. A machine for simultaneously staking lead wires of windings assembled with a slotted armature core assembled with a shaft and a commutator having bars providing notches into which the lead wires are to be staked, said machine comprising means for supporting the core, means for guiding the wires toward the commutator, a plurality of arms movable toward and away from the armature core and longitudinally and radially of said commutator, a plurality of pairs of fingers, each pair of which is carried by one of said arms wherein one finger of each pair is movable relative to the other whereby a wire may be gripped therebetween, mechanical means for moving said arms toward the lead wires of said windings on said armature core, means for effecting relative movement between each pair of fingers for causing said fingers to grip wires when said arms are moved toward said wires, said mechanical means then retracting the arms away from said armature core whereby said wires are carried by said fingers outwardly from the armature and are located between the wire guiding means, means for rotating the armature shaft to cause registration, with the wires as located by the wire guiding means, of those commutator bar notches which are to receive the wires, and wire staking means for forcing the wires into said notches and severing the wire portions then gripped by the fingers from the wire portions received by commutator bar notches.

2. A machine for simultaneously staking lead wires of windings assembled with a slotted armature core assembled with a shaft and a commutator having bars providing notches into which the lead wires are to be staked, said machine comprising means for supporting the core, a plurality of arms movable toward and away from the armature core and longitudinally and radially of said commutator, a plurality of pairs of fingers, each pair of which is carried by one of said arms, wire guiding members mounted for radial movement toward and away from said armature core, mechanical means for moving said arms and fingers from locations behind said wire guiding members to locations which position the fingers adjacent the lead wires of the windings, means for causing said fingers to grip the wires, said mechanical means retracting the arms to positions in which the fingers are behind the wire guiding members for locating the wires held by said fingers between the wire guiding members, means operative after the wires are located between the wire guiding members for moving said members toward the commutator to narrow the spaces between the members and the wires, means for rotating the shaft to cause registration, with the wires as located by the wire guiding means, of those commutator bar notches which are to receive the wires, and wire staking means for forcing the wires into said notches and severing the wire portions then gripped by the fingers from the wire portions received by commutator bar notches.

3. A machine for simultaneously staking lead wires of windings assembled with a slotted armature core assembled with a shaft and a commutator having bars providing notches into which the lead wires are to be staked, said machine comprising means for supporting the armature core, a plurality of arms movable toward and away from the armature core and longitudinally and radially of said commutator, a plurality of pairs of fingers, each pair of which is carried by one of said arms wherein one finger is movable relative to the other for gripping a wire therebetween when said fingers are in closed position, wire guiding members mounted for movement toward and away from the armature core, mechanical means for moving said arms from locations which position the fingers behind the wire guiding members to locations which position the fingers adjacent the lead wires of said windings, means for causing the fingers to grip said wires, said mechanical means then retracting the arms to positions in which the fingers are behind the wire guiding members for locating the wires held thereby between the wire guiding members, means operative after retraction of said arms to move the wire guiding members radially toward the commutator for narrowing the spaces between them which receive the wires, means for moving the core from a retracted position axially to a position preparatory to connecting the wires with the commutator bars, for locating the wires between the wire guiding members in predetermined commutator bar notches, and wire staking members for forcing the wires into said notches and means for severing the wire portions in the grip of said fingers from the wire portions received by said commutator bar notches.

4. A machine according to claim 1 in which the arm moving means includes means for supporting the arms for movement longitudinally and radially of the commutator and mechanism for advancing the arms toward the armature core to locate the fingers adjacent to the wires and for retracting the arms after the fingers have gripped the wires and for causing the arms to move radially toward the commutator preparatory to connecting the wires with the commutator bars.

5. A machine according to claim 1 in which the arm moving means includes means for supporting the arms for movement longitudinally and radially of the commutator and mechanism for advancing the arms toward the armature core to locate the fingers adjacent to the wires and for retracting the arms after the fingers have gripped the wires and for causing the arms to move radially toward the commutator preparatory to connecting the wires with the commutator bars and in which there is a stop normally located so as to limit radial movement of the arms to less than complete movement to position the fingers close to the commutator and means operating after rotation of the armature for retracting the stop to permit completion of movement of the arms.

6. A machine according to claim 1, in which the wire guiding means comprises bars mounted for radial movement relative to the commutator, means for moving said bars toward and away from the commutator, in which the means for forcing the wires into commutator bar notches comprises staking blades, a plurality of staker bars each carrying a staking blade and mounted for radial movement relative to the commutator, each wire guide bar having a notch receiving a staking blade, each of said notches being open to receive a wire located by wire gripping and locating fingers after the wire guide bars have been advanced toward the commutator, and means for causing movement of the staker blade bars toward the commutator.

7. A machine according to claim 1 in which the wire guiding means comprises bars mounted for radial movement relative to the commutator, means for moving said bars toward and away from the commutator, in which the means for forcing the wires into commutator bar notches comprises staking blades, a plurality of staker bars each carrying a staking blade and mounted for radial movement relative to the commutator, each wire guide bar having a notch receiving a staking blade, each of said notches being open to receive a wire located by wire gripping and locating fingers after the wire guide bars have been advanced toward the commutator, means so connecting the wire guide bars with the staker blade bars that, after the wire guide bars have moved sufficiently to cause their notches to be open to receive wires, the staker blade bars move toward the commutator with the wire guide bars, electrically operated means for causing movement of the staker blade bars toward the commutator and comprising electromagnets each having a core, a winding and an armature movable relative to the core, said armatures being connected respectively with the staker blade bars and movable therewith toward their respective cores when the staker blade bars move with the wire guide bars, and means for connecting the electromagnets with a current source after the armatures have been moved by the wire guide bars.

8. A machine according to claim 1 in which there is a carrier which is mounted for movement axially of the commutator, a chuck mounted on the carrier for receiving the armature shaft, means for causing the chuck to grip the shaft after it has received it, fluid pressure operated means for moving the carrier from a retracted position successively into three positions of operation namely, a first position in which the chuck receives the shaft, a second position in which the lead wires are located to be received by the wire gripping fingers and a third position in which the commutator is located for the staking operation, a movable member presenting three stops which limit movement of the carrier respectively to its three functioning positions, means for moving the stop member successively to present the three stops in position for arresting movement of the carrier, a valve for controlling the fluid pressure operated means, means for controlling the valve to cause it to supply pressure fluid to the fluid pressure operated means when required for movement of the carrier into its three functioning positions and when required to retract the carrier and for neutralizing the valve after the carrier has been moved into its first and second functioning positions, and means for bleeding pressure fluid from the fluid pressure operated means at times before movement of said member to substitute its second stop for its first stop and to substitute its third stop for its second stop.

9. A machine according to claim 1 in which there is a carrier which is mounted for movement axially of the commutator, a chuck mounted on the carrier for receiving the armature shaft, means for causing the chuck to grip the shaft after it has received it, means for moving the carrier from a retracted position successively into three positions of operation namely, a first position in which the chuck receives the shaft, a second position in which the lead wires are located to be received by the wire gripping fingers and a third position in which the commutator is located for the staking operation, and in which the means for rotating the armature shaft is provided by means for rotating the chuck while the carrier is in its second functioning position in order to rotate the lead wires into positions for engagement by the wire gripping fingers and for rotating the chuck in a direction opposite to that of first rotation for registering the commutator bar notches with the wires.

10. A machine according to claim 1 in which there is a carrier which is mounted for movement axially of the commutator, a chuck mounted on the carrier for receiving the armature shaft, means for causing the chuck to grip the shaft after it has received it, means for moving the carrier from a retracted position successively into three positions of operation namely, a first position in which the chuck receives the shaft, a second position in which the lead wires are located to be received by the wire gripping fingers and a third position in which the commutator is located for the staking operation, and in which the means for rotating the armature shaft is provided by a fluid pressure receiving cylinder, a piston therein, means for effecting rotation of the chuck by linear movement of the piston, a movable abutment member, a member movable with the piston and presenting to the abutment member two stops, means for moving the abutment from a first position in which it receives the first of said stops, to a second position in which it receives the second of said stops and to a third position in which it is clear of said member movable with the piston, said first position of the abutment member arresting movement of the piston in a first direction so that the chuck is in an angular position to receive the armature shaft, said second position of the abutment member arresting movement of the piston when the chuck has been rotated to bring the lead wires into positions for engagement by the wire grippings means, a valve for controlling application of pressure fluid to the cylinder for movements of the piston in said first direction and in the opposite direction, means for controlling the valve when required for movement of the piston successively in said first direction, into various positions as determined by the stops then in the opposite direction, said valve controlling means neutralizing said valve after the abutment is engaged by the member movable with the piston, and means for bleeding pressure fluid from the cylinder preceding movement of the abutment member away from the first stop of the member movable with the piston and preceding movement of the abutment member away from the second stop of said member to relieve pressure between the abutment and the stops and to prevent further movement of the piston in said first direction.

11. A machine according to claim 1 in which there is an armature core receiving holder, means for causing the armature core to be clamped against the holder in the required angular location preparatory to gripping the armature shaft, a chuck for gripping the armature shaft, and means for moving the chuck axially to carry the armature toward the wire staking means.

12. A machine according to claim 1 in which there is an armature core receiving holder, means for effecting rotation of the core upon the holder when required in order to locate the core in a proper angular relation to the staking means and for clamping the core, in said angular relation, against the holder, a chuck for gripping the armature shaft extending from the core then located in said angular relation, and means for moving the chuck axially to carry the armature toward the wire staking means.

JAMES S. BURGE.
HILTON J. McKEE.
WARREN M. RIDER.

References Cited in the file of this patent

UNITED STATES PATENTS

| Number | Name | Date |
|---|---|---|
| Re. 22,204 | Fraula | Oct. 20, 1942 |
| 2,056,534 | Poole | Oct. 6, 1936 |
| 2,074,366 | Collins | Mar. 23, 1937 |
| 2,270,472 | Poole | Jan. 20, 1942 |
| 2,356,540 | Schwinn | Aug. 22, 1944 |
| 2,385,619 | Fausset | Sept. 25, 1945 |